US011681707B1

(12) United States Patent
Lei et al.

(10) Patent No.: US 11,681,707 B1
(45) Date of Patent: *Jun. 20, 2023

(54) ANALYTICS QUERY RESPONSE TRANSMISSION

(71) Applicant: SPLUNK INC., San Francisco, CA (US)

(72) Inventors: Bo Lei, San Jose, CA (US); Ryan Lee Faircloth, Lakeland, FL (US); Marios Iliofotou, San Jose, CA (US); Sathyanarayanan Kavacheri, Fremont, CA (US); Sadia R. Poddar, Cupertino, CA (US); Anurag Singla, Cupertino, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/691,878

(22) Filed: Mar. 10, 2022

Related U.S. Application Data

(63) Continuation of application No. 16/138,266, filed on Sep. 21, 2018, now Pat. No. 11,301,475.

(51) Int. Cl.
*G06F 16/24* (2019.01)
*G06F 9/54* (2006.01)
*G06F 16/22* (2019.01)
*G06F 16/2455* (2019.01)

(52) U.S. Cl.
CPC ........ *G06F 16/24554* (2019.01); *G06F 9/542* (2013.01); *G06F 16/2228* (2019.01)

(58) Field of Classification Search
CPC ............. G06F 16/24; G06F 16/22; G06F 9/54
See application file for complete search history.

(56) References Cited

U.S. PATENT DOCUMENTS

| | | | |
|---|---|---|---|
| 8,412,696 | B2 | 4/2013 | Zhang et al. |
| 8,589,375 | B2 | 11/2013 | Zhang et al. |
| 8,589,403 | B2 | 11/2013 | Marquardt et al. |
| 8,589,432 | B2 | 11/2013 | Zhang et al. |
| 8,682,925 | B1 | 3/2014 | Marquardt et al. |
| 8,738,587 | B1 | 5/2014 | Bitincka et al. |
| 8,738,629 | B1 | 5/2014 | Bitincka et al. |
| 8,788,525 | B2 | 7/2014 | Neels et al. |
| 8,788,526 | B2 | 7/2014 | Neels et al. |
| 8,826,434 | B2 | 9/2014 | Merza |

(Continued)

OTHER PUBLICATIONS

Splunk Inc., "Transmission Handling of Analytics Query Response", U.S. Appl. No. 16/138,266, including its prosecution history.

*Primary Examiner* — Tyler J Torgrimson
*Assistant Examiner* — Maher N Algibhah
(74) *Attorney, Agent, or Firm* — Ferguson Braswell Fraser Kubasta PC

(57) ABSTRACT

Transmission handling of analytics query response includes a search head, in a data intake and query system, receiving a query from an analytics system. The search head distributes at least a portion of the query to at least one indexer for processing the query. The at least one indexer transmits, bypassing the search head, and to the analytics system, events matching the query. The search head receives from the at least one indexer, data regarding the events, and sends the data regarding the events to the analytics system.

19 Claims, 15 Drawing Sheets

(56) References Cited

U.S. PATENT DOCUMENTS

| | | |
|---|---|---|
| 8,983,994 B2 | 3/2015 | Neels et al. |
| 10,698,895 B2 | 6/2020 | Lucas et al. |
| 10,963,347 B1 | 3/2021 | Chen et al. |
| 2009/0006045 A1* | 1/2009 | Liu .................. G06Q 30/02 703/2 |
| 2013/0326620 A1 | 12/2013 | Merza et al. |
| 2014/0214888 A1 | 7/2014 | Marquardt et al. |
| 2014/0236889 A1 | 8/2014 | Vasan et al. |
| 2014/0236890 A1 | 8/2014 | Vasan et al. |
| 2014/0324862 A1 | 10/2014 | Bingham et al. |
| 2014/0330815 A1 | 11/2014 | Bitincka et al. |
| 2014/0344256 A1 | 11/2014 | Bitincka et al. |
| 2015/0019537 A1 | 1/2015 | Neels et al. |
| 2015/0033332 A1 | 1/2015 | Merza |
| 2015/0033333 A1 | 1/2015 | Merza |
| 2015/0142847 A1 | 5/2015 | Neels et al. |
| 2015/0339344 A1 | 11/2015 | Neels et al. |
| 2016/0004750 A1 | 1/2016 | Marquardt et al. |
| 2016/0036850 A1 | 2/2016 | Merza |
| 2016/0036851 A1 | 2/2016 | Merza |
| 2016/0088125 A1 | 3/2016 | Polychronis |
| 2017/0031659 A1 | 2/2017 | Burke et al. |

\* cited by examiner

EXAMPLE
RETURNED
MESSAGE
1600

1602 {
kafka_bkt,_cd,_eventtype_color,_indextime,_kv,_raw,_serial,_si,_sourcetype,_subsecond,_time,dest_host,dest_ip,dest_mac,lease_duration,signature,sourcetype,tag,_uba_datasourceid,_uba_namespace,_uba_splunk_raw,_uba_format,__mv__bkt,__mv__cd,__mv__eventtype_color,__mv__indextime,__mv__kv,__mv__raw,__mv__serial,__mv__si,__mv__sourcetype,__mv__subsecond,__mv__time,__mv_dest_host,__mv_dest_ip,__mv_dest_mac,__mv_lease_duration,__mv_signature,__mv_sourcetype,__mv_tag,__mv__uba_datastreamid,__mv__uba_namespace,__mv__uba_splunk_raw,__mv__uba_format 1604 {
brodhcp2~9~493DF5D1-D194-4E48-AEFA-325BBEA5096A,9:33655044,none,1532391050,1,1532391048.99     CzlmR51STBuQ86NPag   192.168.16.4 67     10.231.0.7    67     30:59:b7:14:bc:84    192.168.17.187      3600.000000      1705813318,0,"mrt.sv.splunk.com 1606 {
brodhcp2",bro_dhcp,,99,1532391048.99,,10.231.0.7,30:59:b7:14:bc:84,3600.000000,DHCPACK,bro_dhcp,"dhcp network session",-3113198680315274626,namespace,false,SPLUNK/DIRECT_CIM,,,,,,,,$mrt.sv.splunk.com$;$brodhcp2$,,,,$10.231.0.7$,,$3600.000000$,,,$dhcp$;$network$;$session$,,,, 1608 {
brodhcp2~9~493DF5D1-D194-4E48-AEFA-325BBEA5096A,9:33655038,none,1532391050,1,1532391047.99     CzlmR51STBuQ86NPag   192.168.16.4 67     10.231.0.7    67     30:59:b7:14:bc:84    192.168.17.187      3600.000000      1705813318,1,"mrt.sv.splunk.com 1610 {
brodhcp2",bro_dhcp,,99,1532391047.99,,10.231.0.7,30:59:b7:14:bc:84,3600.000000,DHCPACK,bro_dhcp,"dhcp network session",-3113198680315274626,namespace,false,SPLUNK/DIRECT_CIM,,,,,,,,$mrt.sv.splunk.com$;$brodhcp2$,,,,$10.231.0.7$,,$3600.000000$,,,$dhcp$;$network$;$session$,,,,

FIG. 16

ANALYTICS QUERY RESPONSE TRANSMISSION

CROSS REFERENCE TO RELATED APPLICATIONS

This application is a continuation of, and thereby claims the benefit of priority under 35 U.S.C. § 120, to U.S. patent application Ser. No. 16/138,266 filed on Sep. 21, 2018, which is incorporated herein by reference in its entirety.

BACKGROUND

Bandwidth is the maximum amount of data that can be processed within a fixed amount of time. When the bandwidth is less than the volume of data to be processed, the bandwidth acts as a limit on a computer and networks ability to process data. One way in which bandwidth is limited is when data from multiple producers of the data is processed through a single component. The component forms a bottleneck by which the data is not quickly further processed.

BRIEF DESCRIPTION OF DRAWINGS

In the drawings:

FIG. 16 is an example of a returned event message format in accordance with disclosed embodiments.

DETAILED DESCRIPTION

Figure 1:
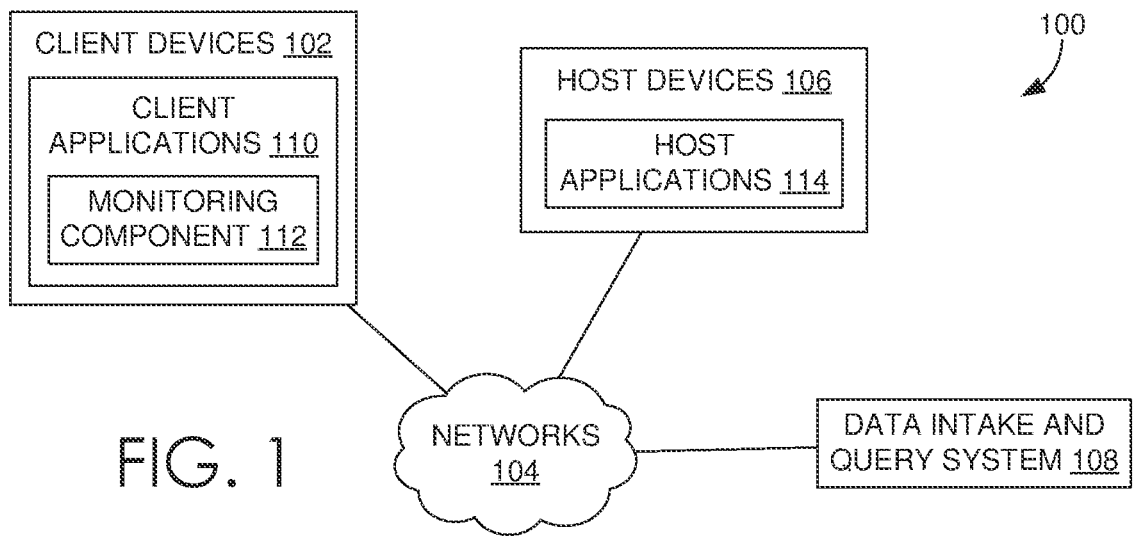
FIG. 1 illustrates a networked computer environment in which an embodiment may be implemented.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments, the various disclosed embodiments may be combined in virtually any manner All combinations are contemplated herein.

In general, embodiments are directed to bandwidth management in a query system. An analytics system monitors events in the query system for behavior and security analysis. To obtain the events, the analytics system sends requests to a search head that determines where matching events may be stored. The search head then sends the query to the corresponding indexers that are connected to the identified locations. Rather than the indexers returning the events to the search head for the search head to send the events to the analytics system, the indexers bypass the search head to transmit the events to the analytics system. The indexers may then send an event count to the search head, which performs an aggregation across indexers. By each indexer sending responses directly to the analytics system, and having the analytics system manage the responses from multiple indexers, the search head is not a limit on the bandwidth for the response.

Embodiments are described herein according to the following outline:

1.0. General Overview
2.0. Operating Environment
   2.1. Host Devices
   2.2. Client Devices
   2.3. Client Device Applications
   2.4. Data Server System
   2.5. Data Ingestion
      2.5.1. Input
      2.5.2. Parsing
      2.5.3. Indexing 2.6. Query Processing
2.7. Field Extraction
2.8. Acceleration Techniques
  2.8.1. Aggregation Technique
  2.8.2. Keyword Index
  2.8.3. High Performance Analytics Store
  2.8.4. Accelerating Report Generation
2.9. Security Features
2.10. Data Center Monitoring
2.11. Cloud-Based System Overview
  2.12. Searching Externally Archived Data
  2.12.1. ERP Process Features
2.13. IT Service Monitoring
3.0. Transmission Handling Of Analytics Query Response
4.0. Hardware

1.0. GENERAL OVERVIEW

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

2.0. OPERATING ENVIRONMENT

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
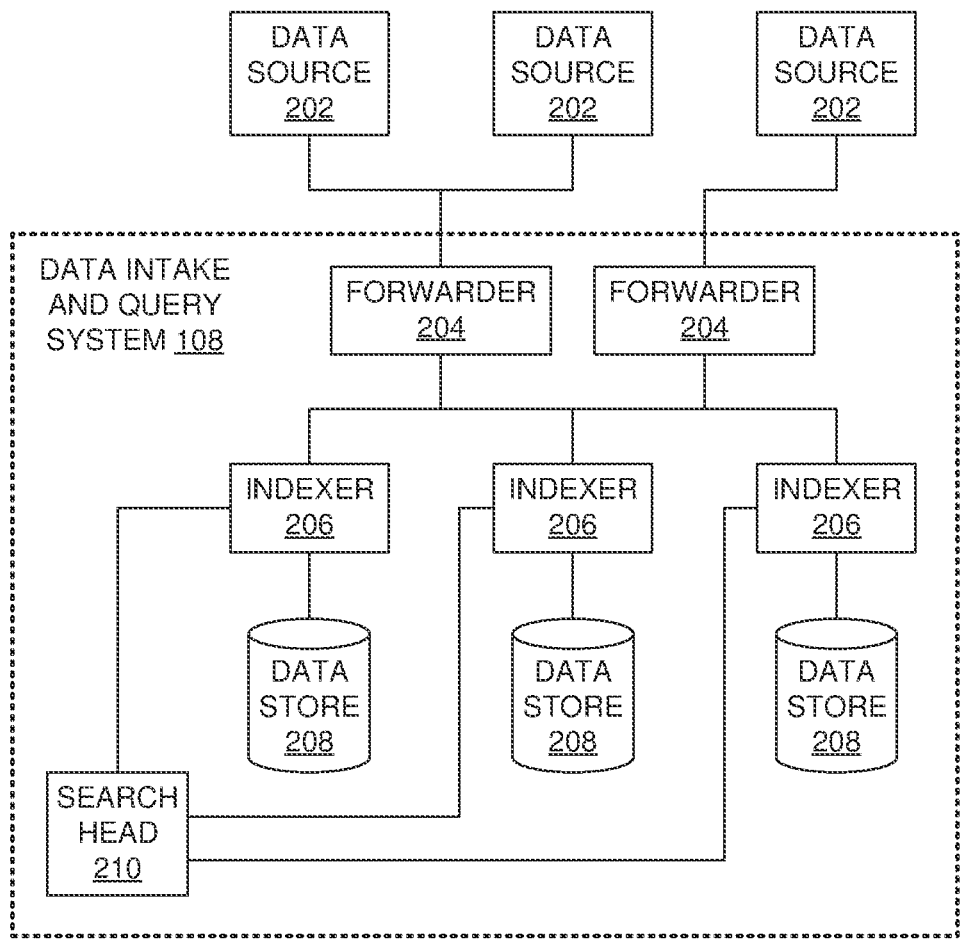
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally, or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

2.5. Data Ingestion

Figure 3:
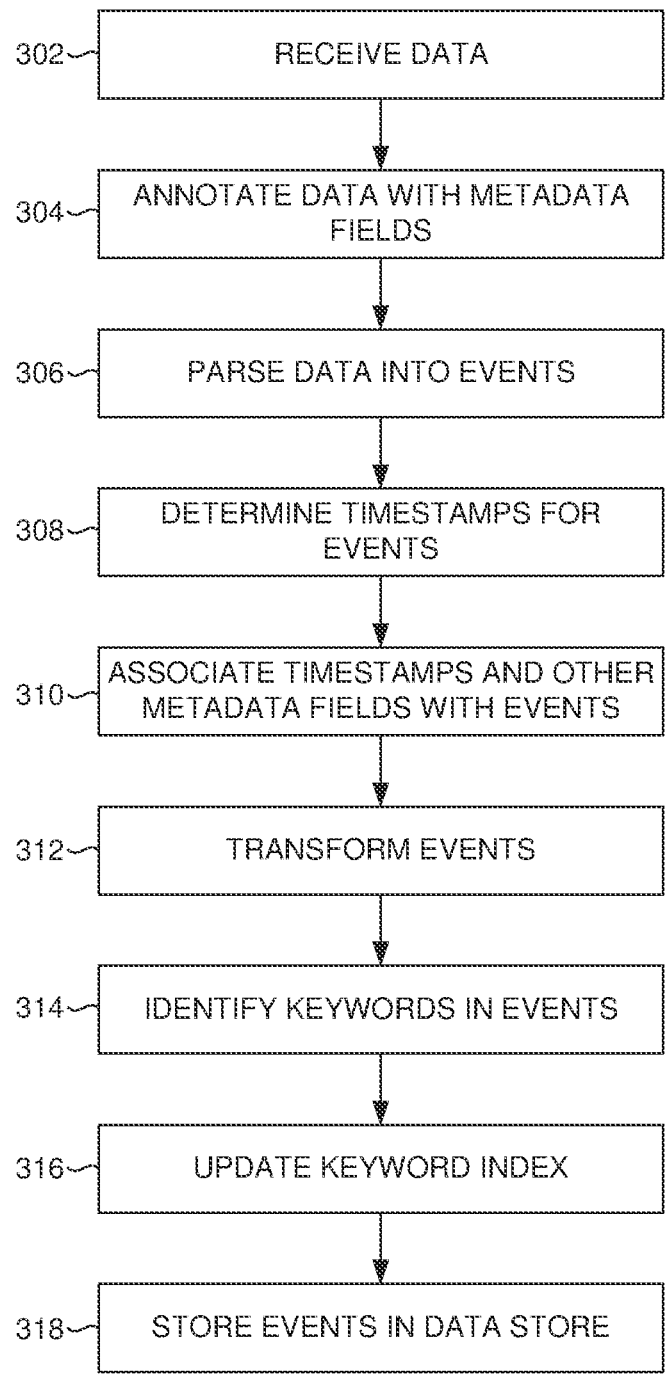
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

2.5.1. Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally, or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

2.5.2. Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events and may also include one or more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

2.5.3. Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equal sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "SITE-BASED SEARCH AFFINITY", filed on 30 Apr. 2014, and in U.S. patent application Ser. No. 14/266,817, entitled "MULTI- SITE CLUSTERING", also filed on 30 Apr. 2014, each of which is hereby incorporated by reference in its entirety for all purposes.

2.6. Query Processing

Figure 4:
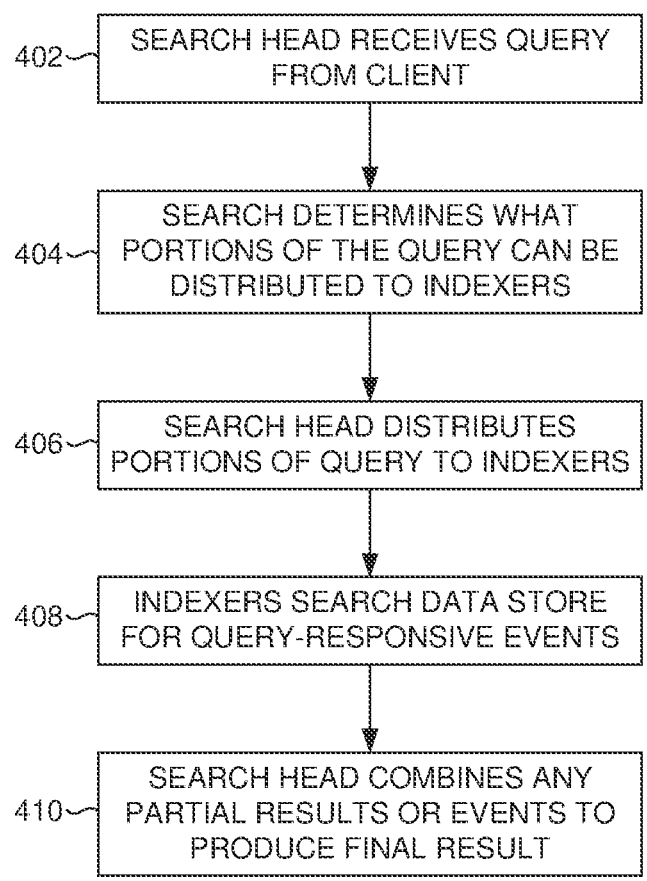
FIG. 4 is a flow diagram that illustrates how a search head and indexers perform a search query in accordance with the disclosed embodiments.

FIG. 4 is a flow diagram that illustrates an example process that a search head and one or more indexers may perform during a search query. At block 402, a search head receives a search query from a client. At block 404, the search head analyzes the search query to determine what portion(s) of the query can be delegated to indexers and what portions of the query can be executed locally by the search head. At block 406, the search head distributes the determined portions of the query to the appropriate indexers. In an embodiment, a search head cluster may take the place of an independent search head where each search head in the search head cluster coordinates with peer search heads in the search head cluster to schedule jobs, replicate search results, update configurations, fulfill search requests, etc. In an embodiment, the search head (or each search head) communicates with a master node (also known as a cluster master, not shown in Fig.) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 408, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 408 may use the late-binding schema to extract values for specified fields from events at the time the query is processed. In an embodiment, one or more rules for extracting field values may be specified as part of a source type definition. The indexers may then either send the relevant events back to the search head, or use the events to determine a partial result, and send the partial result back to the search head.

At block 410, the search head combines the partial results and/or events received from the indexers to produce a final result for the query. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries that are performed on a periodic basis.

2.7. Field Extraction

The search head 210 allows users to search and visualize event data extracted from raw machine data received from homogenous data sources. It also allows users to search and visualize event data extracted from raw machine data received from heterogeneous data sources. The search head 210 includes various mechanisms, which may additionally reside in an indexer 206, for processing a query. Splunk Processing Language (SPL), used in conjunction with the SPLUNK® ENTERPRISE system, can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

The search head 210 can apply the extraction rules to event data that it receives from indexers 206. Indexers 206 may apply the extraction rules to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

Figure 5:
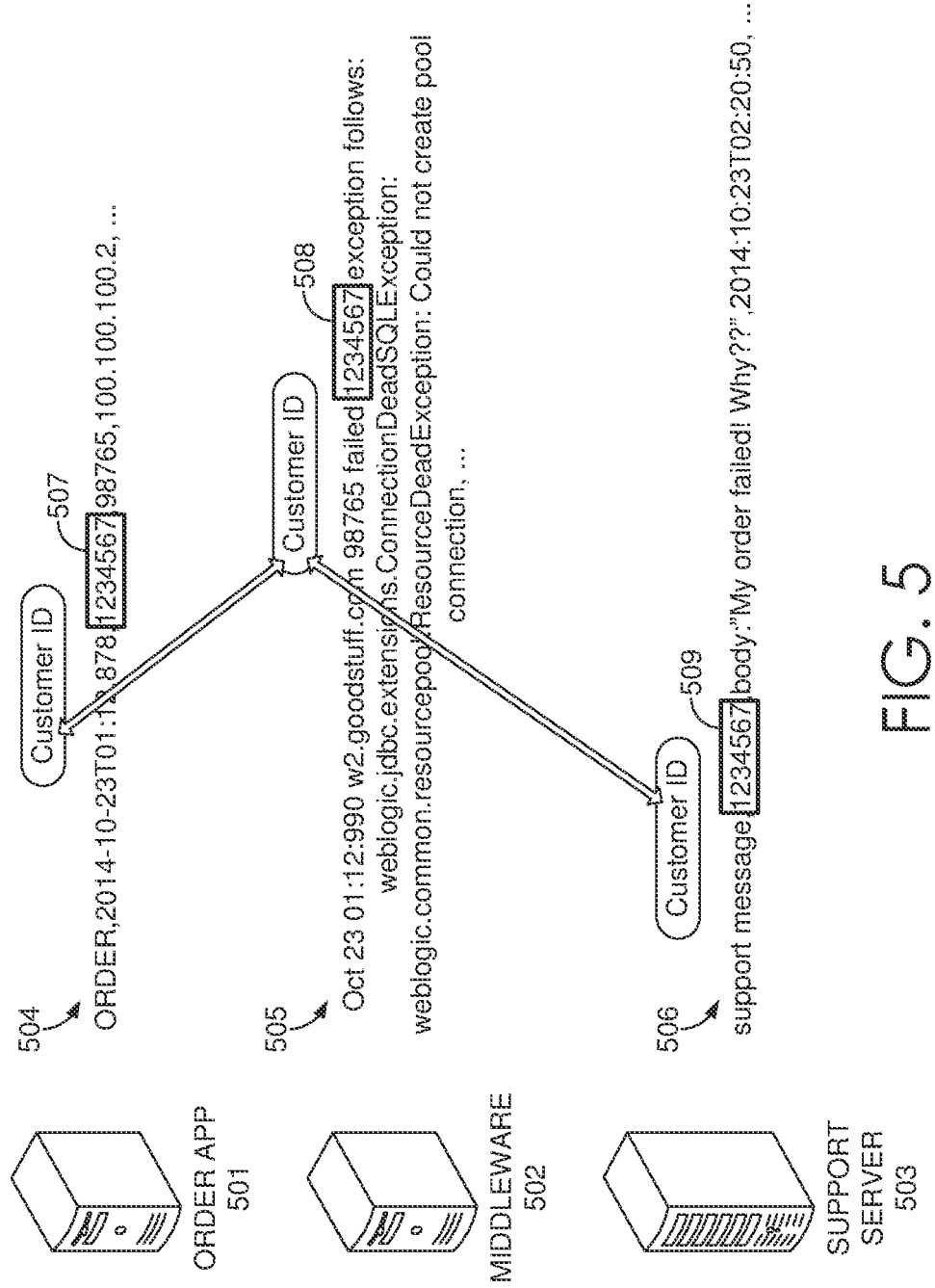
FIG. 5 illustrates a scenario where a common customer ID is found among log data received from three disparate sources in accordance with the disclosed embodiments.

FIG. 5 illustrates an example of raw machine data received from disparate data sources. In this example, a user submits an order for merchandise using a vendor's shopping application program 501 running on the user's system. In this example, the order was not delivered to the vendor's server due to a resource exception at the destination server that is detected by the middleware code 502. The user then sends a message to the customer support 503 to complain about the order failing to complete. The three systems 501, 502, and 503 are disparate systems that do not have a common logging format. The order application 501 sends log data 504 to the SPLUNK® ENTERPRISE system in one format, the middleware code 502 sends error log data 505 in a second format, and the support server 503 sends log data 506 in a third format.

Using the log data received at one or more indexers 206 from the three systems the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems—there is a semantic relationship between the customer ID field values generated by the three systems. The search head 210 requests event data from the one or more indexers 206 to gather relevant event data from the three systems. It then applies extraction rules to the event data in order to extract field values that it can correlate. The search head may apply a different extraction rule to each set of events from each system when the event data format differs among systems. In this example, the user interface can display to the administrator the event data corresponding to the common customer ID field values 507, 508, and 509, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, or a visualization, such as a graph or chart, generated from the values.

2.8.1. Aggregation Technique

Figure 6:
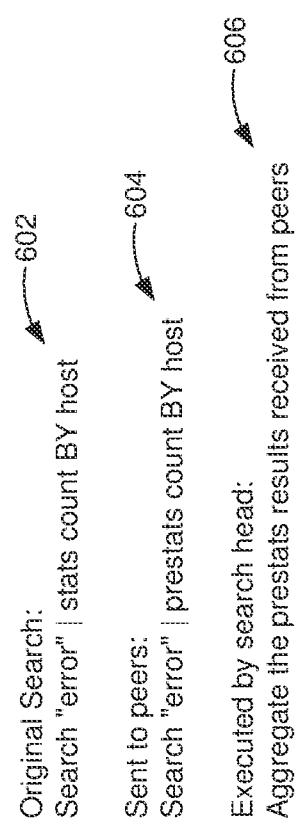
FIG. 6 illustrates how a search query received from a client at a search head can split into two phases in accordance with a disclosed embodiment.

To facilitate faster query processing, a query can be structured such that multiple indexers perform the query in parallel, while aggregation of search results from the multiple indexers is performed locally at the search head. For example, FIG. 6 illustrates how a search query 602 received from a client at a search head 210 can split into two phases, including: (1) subtasks 604 (e.g., data retrieval or simple filtering) that may be performed in parallel by indexers 206 for execution, and (2) a search results aggregation operation 606 to be executed by the search head when the results are ultimately collected from the indexers.

During operation, upon receiving search query 602, a search head 210 determines that a portion of the operations involved with the search query may be performed locally by the search head. The search head modifies search query 602 by substituting "stats" (create aggregate statistics over results sets received from the indexers at the search head) with "prestats" (create statistics by the indexer from local results set) to produce search query 604, and then distributes search query 804 to distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 4, or may alternatively distribute a modified version (e.g., a more restricted version) of the search query to the search peers. In this example, the indexers are responsible for producing the results and sending them to the search head. After the indexers return the results to the search head, the search head aggregates the received results 806 to form a single search result set. By executing the query in this manner, the system effectively distributes the computational operations across the indexers while minimizing data transfers.

2.8.2. Keyword Index

As described above with reference to the flow charts in FIG. 3 and FIG. 4, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.8.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the event data and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "DISTRIBUTED HIGH PERFORMANCE ANALYTICS STORE", issued on 25 Mar. 2014, U.S. patent application Ser. No. 14/170,159, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.8.4. Accelerating Report Generation

In some embodiments, a data server system such as the SPLUNK® ENTERPRISE system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criterion, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer event data needs to be processed while generating an updated report. These report acceleration techniques are described in more detail in U.S. Pat. No. 8,589,403, entitled "COMPRESSED JOURNALING IN EVENT TRACKING FILES FOR METADATA RECOVERY AND REPLICATION", issued on 19 Nov. 2013, U.S. Pat. No. 8,412,696, entitled "REAL TIME SEARCHING AND REPORTING", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety.

2.9. Security Features

The SPLUNK® ENTERPRISE platform provides various schemas, dashboards and visualizations that simplify developers' task to create applications with additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. SPLUNK® APP FOR ENTERPRISE SECURITY provides the security practitioner with visibility into security-relevant threats found in the enterprise infrastructure by capturing, monitoring, and reporting on data from enterprise security devices, systems, and applications. Through the use of SPLUNK® ENTERPRISE searching and reporting capabilities, SPLUNK® APP FOR ENTERPRISE SECURITY provides a top-down and bottom-up view of an organization's security posture.

The SPLUNK® APP FOR ENTERPRISE SECURITY leverages SPLUNK® ENTERPRISE search-time normalization techniques, saved searches, and correlation searches to provide visibility into security-relevant threats and activity and generate notable events for tracking. The App enables the security practitioner to investigate and explore the data to find new or unknown threats that do not follow signature-based patterns.

Conventional Security Information and Event Management (SIEM) systems that lack the infrastructure to effectively store and analyze large volumes of security-related data. Traditional SIEM systems typically use fixed schemas to extract data from pre-defined security-related fields at data ingestion time and storing the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data and enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. patent application Ser. No. 13/956,252, entitled "INVESTIGATIVE AND DYNAMIC DETECTION OF POTENTIAL SECURITY-THREAT INDICATORS FROM EVENTS IN BIG DATA", filed on 31 Jul. 2013, U.S. patent application Ser. No. 14/445,018, entitled "GRAPHIC DISPLAY OF SECURITY THREATS BASED ON INDICATIONS OF ACCESS TO NEWLY REGISTERED DOMAINS", filed on 28 Jul. 2014, U.S. patent application Ser. No. 14/445,023, entitled "SECURITY THREAT DETECTION OF NEWLY REGISTERED DOMAINS", filed on 28 Jul. 2014, U.S. patent application Ser. No. 14/815,971, entitled "SECURITY THREAT DETECTION USING DOMAIN NAME ACCESSES", filed on 1 Aug. 2015, and U.S. patent application Ser. No. 14/815,972, entitled "SECURITY THREAT DETECTION USING DOMAIN NAME REGISTRATIONS", filed on 1 Aug. 2015, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting "notable events" that are likely to indicate a security threat. These notable events can be detected in a number of ways: (1) a user can notice a correlation in the data and can manually identify a corresponding group of one or more events as "notable;" or (2) a user can define a "correlation search" specifying criteria for a notable event, and every time one or more events satisfy the criteria, the application can indicate that the one or more events are notable. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

2.10. Data Center Monitoring

As mentioned above, the SPLUNK® ENTERPRISE platform provides various features that simplify the developers' task to create various applications. One such application is SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the SPLUNK® APP FOR VMWARE® stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "CORRELATION FOR USER-SELECTED TIME RANGES OF VALUES FOR PERFORMANCE METRICS OF COMPONENTS IN AN INFORMATION-TECHNOLOGY ENVIRONMENT WITH LOG DATA FROM THAT INFORMATION-TECHNOLOGY ENVIRONMENT", filed on 29 Jan. 2014, and which is hereby incorporated by reference in its entirety for all purposes.

To facilitate retrieving information of interest from performance data and log files, the SPLUNK® APP FOR VMWARE® provides pre-specified schemas for extracting relevant values from different types of performance-related event data, and also enables a user to define such schemas.

2.11. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one or more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 7:
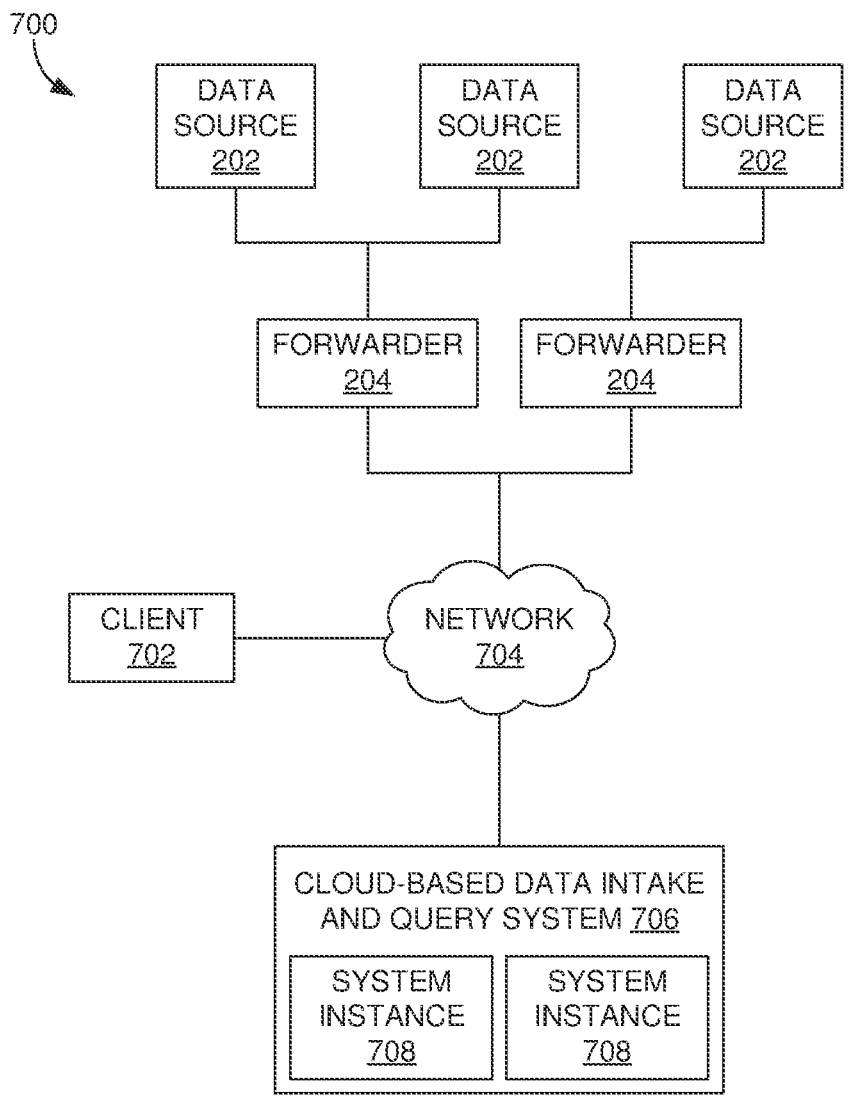
FIG. 7 illustrates a block diagram of an example cloud-based data intake and query system in accordance with the disclosed embodiments.

FIG. 7 illustrates a block diagram of an example cloud-based data intake and query system. Similar to the system of FIG. 2, the networked computer system 700 includes input data sources 202 and forwarders 204. These input data sources and forwarders may be in a subscriber's private computing environment. Alternatively, they might be directly managed by the service provider as part of the cloud service. In the example system 700, one or more forwarders 204 and client devices 702 are coupled to a cloud-based data intake and query system 706 via one or more networks 704. Network 704 broadly represents one or more LANs, WANs, cellular networks, intranetworks, internetworks, etc., using any of wired, wireless, terrestrial microwave, satellite links, etc., and may include the public Internet, and is used by client devices 702 and forwarders 204 to access the system 706 Similar to the system of 108, each of the forwarders 204 may be configured to receive data from an input source and to forward the data to other components of the system 706 for further processing.

In an embodiment, a cloud-based data intake and query system 706 may comprise a plurality of system instances 708. In general, each system instance 708 may include one or more computing resources managed by a provider of the cloud-based system 706 made available to a particular subscriber. The computing resources comprising a system instance 708 may, for example, include one or more servers or other devices configured to implement one or more forwarders, indexers, search heads, and other components of a data intake and query system, similar to system 108. As indicated above, a subscriber may use a web browser or other application of a client device 702 to access a web portal or other interface that enables the subscriber to configure an instance 708.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 708) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD are centrally visible).

2.12. Searching Externally Archived Data

Figure 8:
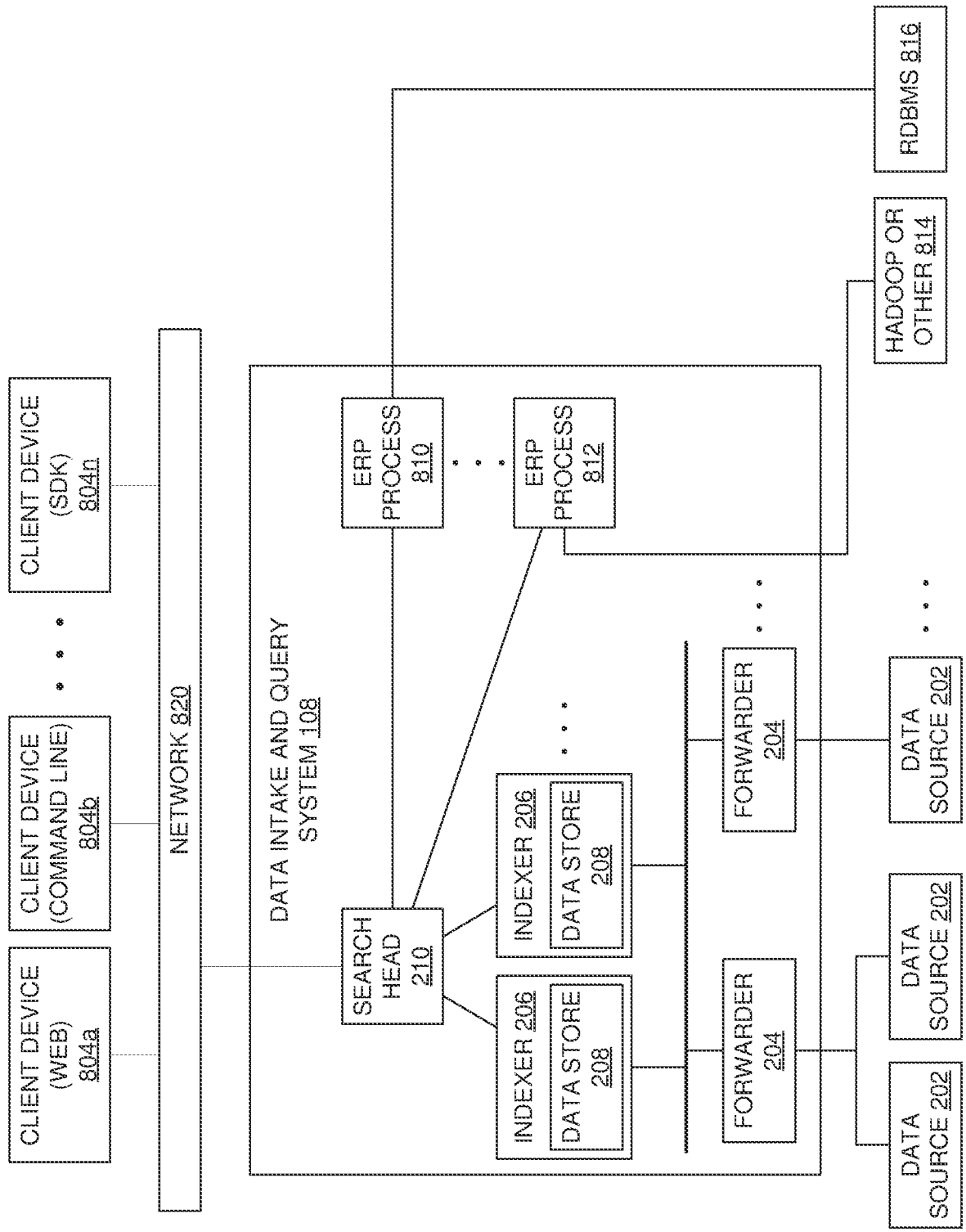
FIG. 8 illustrates a block diagram of an example data intake and query system that performs searches across external data systems in accordance with the disclosed embodiments.

FIG. 8 shows a block diagram of an example of a data intake and query system 108 that provides transparent search facilities for data systems that are external to the data intake and query system. Such facilities are available in the HUNK® system provided by Splunk Inc. of San Francisco, Calif. HUNK® represents an analytics platform that enables business and IT teams to rapidly explore, analyze, and visualize data in Hadoop and NoSQL data stores.

The search head 210 of the data intake and query system receives search requests from one or more client devices 804 over network connections 820. As discussed above, the data intake and query system 108 may reside in an enterprise location, in the cloud, etc. FIG. 8 illustrates that multiple client devices 804a, 804b, . . . , 804n may communicate with the data intake and query system 108. The client devices 804 may communicate with the data intake and query system using a variety of connections. For example, one client device in FIG. 8 is illustrated as communicating over an Internet (Web) protocol, another client device is illustrated as communicating via a command line interface, and another client device is illustrated as communicating via a system developer kit (SDK).

The search head 210 analyzes the received search request to identify request parameters. If a search request received from one of the client devices 804 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 810. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 810, 812. FIG. 8 shows two ERP processes 810, 812 that connect to respective remote (external) virtual indices, which are indicated as a Hadoop or another system 814 (e.g., Amazon S3, Amazon EMR, other Hadoop Compatible File Systems (HCFS), etc.) and a relational database management system (RDBMS) 816. Other virtual indices may include other file organizations and protocols, such as Structured Query Language (SQL) and the like. The ellipses between the ERP processes 810, 812 indicate optional additional ERP processes of the data intake and query system 108. An ERP process may be a computer process that is initiated or spawned by the search head 210 and is executed by the search data intake and query system 108. Alternatively, or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to an SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 810, 812 receive a search request from the search head 210. The search head may optimize the received search request for execution at the respective external virtual index. Alternatively, the ERP process may receive a search request as a result of analysis performed by the search head or by a different system process. The ERP processes 810, 812 can communicate with the search head 210 via conventional input/output routines (e.g., standard in/standard out, etc.). In this way, the ERP process receives the search request from a client device such that the search request may be efficiently executed at the corresponding external virtual index.

The ERP processes 810, 812 may be implemented as a process of the data intake and query system. Each ERP process may be provided by the data intake and query system or may be provided by process or application providers who are independent of the data intake and query system. Each respective ERP process may include an interface application installed at a computer of the external result provider that ensures proper communication between the search support system and the external result provider. The ERP processes 810, 812 generate appropriate search requests in the protocol and syntax of the respective virtual indices 814, 816, each of which corresponds to the search request received by the search head 210. Upon receiving search results from their corresponding virtual indices, the respective ERP process passes the result to the search head 210, which may return or display the results, or a processed set of results based on the returned results to the respective client device.

Client devices 804 may communicate with the data intake and query system 108 through a network interface 820, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "EXTERNAL RESULT PROVIDED PROCESS FOR RETRIEVING DATA STORED USING A DIFFERENT CONFIGURATION OR PROTOCOL", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. patent application Ser. No. 14/449,144, entitled "PROCESSING A SYSTEM SEARCH REQUEST INCLUDING EXTERNAL DATA SOURCES", filed on 31 Jul. 2014, each of which is hereby incorporated by reference in its entirety for all purposes.

2.12.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the raw data obtained from the external data source) are provided to the search head, which can then process the results data (e.g., break the raw data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the raw or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of raw data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically, the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the raw data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One example query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return raw data to the search head. As noted, the ERP process could be configured to operate in streaming mode alone and return just the raw data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all raw data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.13. It Service Monitoring

As previously mentioned, the SPLUNK® ENTERPRISE platform provides various schemas, dashboards and visualizations that make it easy for developers to create applications to provide additional capabilities. One such application is SPLUNK® IT SERVICE INTELLIGENCE™, which performs monitoring and alerting operations. It also includes analytics to help an analyst diagnose the root cause of performance problems based on large volumes of data stored by the SPLUNK® ENTERPRISE system as correlated to the various services an IT organization provides (a service-centric view). This differs significantly from conventional IT monitoring systems that lack the infrastructure to effectively store and analyze large volumes of service-related event data. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations, when all of the original data may be needed to determine the root cause of or contributing factors to a service issue.

In contrast, a SPLUNK® IT SERVICE INTELLIGENCE™ system stores large volumes of minimally-processed service-related data at ingestion time for later retrieval and analysis at search time, to perform regular monitoring, or to investigate a service issue. To facilitate this data retrieval process, SPLUNK® IT SERVICE INTELLIGENCE™ enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the event data that pertains to the entity, whether produced by the entity itself or by another machine and considering the many various ways the entity may be identified in raw machine data (such as by a URL, an IP address, or machine name) The service and entity definitions can organize event data around a service so that all of the event data pertaining to that service can be easily identified. This capability provides a foundation for the implementation of Key Performance Indicators.

One or more Key Performance Indicators (KPI's) are defined for a service within the SPLUNK® IT SERVICE INTELLIGENCE™ application. Each KPI measures an aspect of service performance at a point in time or over a period of time (aspect KPI's). Each KPI is defined by a search query that derives a KPI value from the machine data of events associated with the entities that provide the service. Information in the entity definitions may be used to identify the appropriate events at the time a KPI is defined or whenever a KPI value is being determined. The KPI values derived over time may be stored to build a valuable repository of current and historical performance information for the service, and the repository, itself, may be subject to search query processing. Aggregate KPIs may be defined to provide a measure of service performance calculated from a set of service aspect KPI values; this aggregate may even be taken across defined timeframes and/or across multiple services. A particular service may have an aggregate KPI derived from substantially all of the aspect KPI's of the service to indicate an overall health score for the service.

SPLUNK® IT SERVICE INTELLIGENCE™ facilitates the production of meaningful aggregate KPI's through a system of KPI thresholds and state values. Different KPI definitions may produce values in different ranges, and so the same value may mean something very different from one KPI definition to another. To address this, SPLUNK® IT SERVICE INTELLIGENCE™ implements a translation of individual KPI values to a common domain of "state" values. For example, a KPI range of values may be 1-100, or 50-275, while values in the state domain may be 'critical,' 'warning,' 'normal,' and 'informational'. Thresholds associated with a particular KPI definition determine ranges of values for that KPI that correspond to the various state values. In one case, KPI values 95-100 may be set to correspond to 'critical' in the state domain. KPI values from disparate KPI's can be processed uniformly once they are translated into the common state values using the thresholds. For example, "normal 80% of the time" can be applied across various KPI's. To provide meaningful aggregate KPI's, a weighting value can be assigned to each KPI so that its influence on the calculated aggregate KPI value is increased or decreased relative to the other KPI's.

One service in an IT environment often impacts, or is impacted by, another service. SPLUNK® IT SERVICE INTELLIGENCE™ can reflect these dependencies. For example, a dependency relationship between a corporate e-mail service and a centralized authentication service can be reflected by recording an association between their respective service definitions. The recorded associations establish a service dependency topology that informs the data or selection options presented in a GUI, for example. (The service dependency topology is like a "map" showing how services are connected based on their dependencies.) The service topology may itself be depicted in a GUI and may be interactive to allow navigation among related services.

Entity definitions in SPLUNK® IT SERVICE INTELLIGENCE™ can include informational fields that can serve as metadata, implied data fields, or attributed data fields for the events identified by other aspects of the entity definition. Entity definitions in SPLUNK® IT SERVICE INTELLIGENCE™ can also be created and updated by an import of tabular data (as represented in a CSV, another delimited file, or a search query result set). The import may be GUI-mediated or processed using import parameters from a GUI-based import definition process. Entity definitions in SPLUNK® IT SERVICE INTELLIGENCE™ can also be associated with a service by means of a service definition rule. Processing the rule results in the matching entity definitions being associated with the service definition. The rule can be processed at creation time, and thereafter on a scheduled or on-demand basis. This allows dynamic, rule-based updates to the service definition.

During operation, SPLUNK® IT SERVICE INTELLIGENCE™ can recognize so-called "notable events" that may indicate a service performance problem or other situation of interest. These notable events can be recognized by a "correlation search" specifying trigger criteria for a notable event: every time KPI values satisfy the criteria, the application indicates a notable event. A severity level for the notable event may also be specified. Furthermore, when trigger criteria are satisfied, the correlation search may additionally or alternatively cause a service ticket to be created in an IT service management (ITSM) system, such as a system available from ServiceNow, Inc., of Santa Clara, Calif.

SPLUNK® IT SERVICE INTELLIGENCE™ provides various visualizations built on its service-centric organization of event data and the KPI values generated and collected. Visualizations can be particularly useful for monitoring or investigating service performance. SPLUNK® IT SERVICE INTELLIGENCE™ provides a service monitoring interface suitable as the home page for ongoing IT service monitoring. The interface is appropriate for settings such as desktop use or for a wall-mounted display in a network operations center (NOC). The interface may prominently display a services health section with tiles for the aggregate KPI's indicating overall health for defined services and a general KPI section with tiles for KPI's related to individual service aspects. These tiles may display KPI information in a variety of ways, such as by being colored and ordered according to factors like the KPI state value. They also can be interactive and navigate to visualizations of more detailed KPI information.

SPLUNK® IT SERVICE INTELLIGENCE™ provides a service-monitoring dashboard visualization based on a user-defined template. The template can include user-selectable widgets of varying types and styles to display KPI information. The content and the appearance of widgets can respond dynamically to changing KPI information. The KPI widgets can appear in conjunction with a background image, user drawing objects, or other visual elements, that depict the IT operations environment, for example. The KPI widgets or other GUI elements can be interactive so as to provide navigation to visualizations of more detailed KPI information.

SPLUNK® IT SERVICE INTELLIGENCE™ provides a visualization showing detailed time-series information for multiple KPI's in parallel graph lanes. The length of each lane can correspond to a uniform time range, while the width of each lane may be automatically adjusted to fit the displayed KPI data. Data within each lane may be displayed in a user selectable style, such as a line, area, or bar chart. During operation a user may select a position in the time range of the graph lanes to activate lane inspection at that point in time. Lane inspection may display an indicator for the selected time across the graph lanes and display the KPI value associated with that point in time for each of the graph lanes. The visualization may also provide navigation to an interface for defining a correlation search, using information from the visualization to pre-populate the definition.

SPLUNK® IT SERVICE INTELLIGENCE™ provides a visualization for incident review showing detailed information for notable events. The incident review visualization may also show summary information for the notable events over a time frame, such as an indication of the number of notable events at each of a number of severity levels. The severity level display may be presented as a rainbow chart with the warmest color associated with the highest severity classification. The incident review visualization may also show summary information for the notable events over a time frame, such as the number of notable events occurring within segments of the time frame. The incident review visualization may display a list of notable events within the time frame ordered by any number of factors, such as time or severity. The selection of a particular notable event from the list may display detailed information about that notable event, including an identification of the correlation search that generated the notable event.

SPLUNK® IT SERVICE INTELLIGENCE™ provides pre-specified schemas for extracting relevant values from the different types of service-related event data. It also enables a user to define such schemas.

3.0 TRANSMISSION HANDLING OF ANALYTICS QUERY RESPONSE

Figure 9:
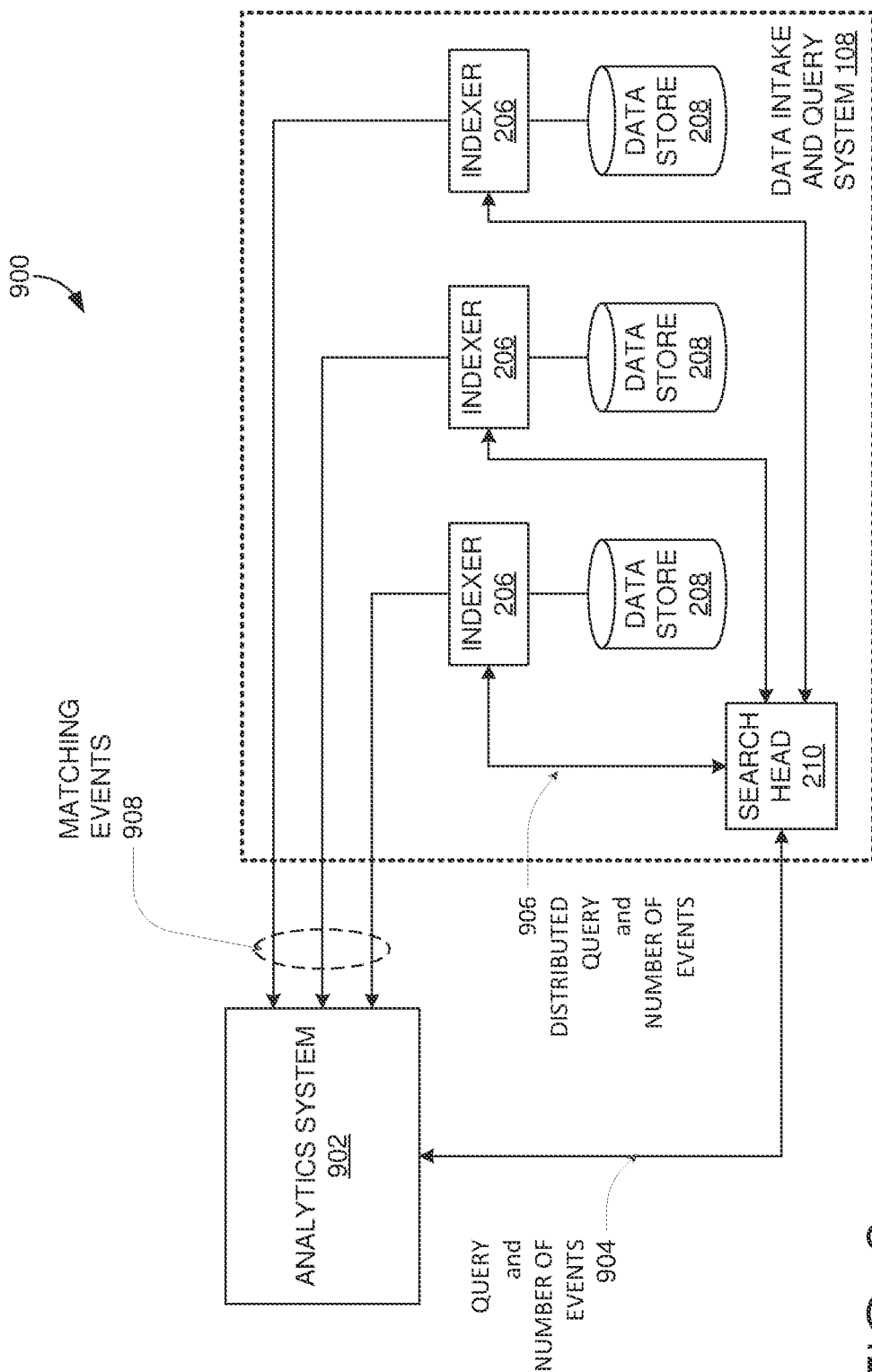
FIG. 9 illustrates a block diagram of an example data intake and query system connected to an analytics system in accordance with the disclosed embodiments.

As discussed above, to manage bandwidth, events are transmitted by the indexer to the analytics system while bypassing the search head. FIG. 9 illustrates a block diagram (900) of an example data intake and query system (108) connected to an analytics system (902) in accordance with the disclosed embodiments. The data intake and query system (108) may correspond to the data intake and query system (108) discussed above with reference to FIG. 2. Like numbered components of FIG. 9 are the same as the corresponding components in FIG. 2. For the purposes of clarifying the description, the forwarders of the data intake and query system are not shown in FIG. 9. The data intake and query system 108 may correspond to a server group having multiple computing systems. Each computing system may, for example, correspond to hardware. As another example, each server may correspond to a virtual computing system, such as a virtual machine. Thus, the indexers 206, data stores 208, and search head 210 may each be a separate computing system. The various computing systems may be connected via a network connection using one or more network devices. The various computing systems may have corresponding bandwidth limitations. The bandwidth limitations include the processing limitations on processing queries and responses as well as network limitations of the network connected to the various computing systems.

Continuing with FIG. 9, an analytics system 902 is connected to the data intake and query system. The analytics system 902 is a computing system that includes functionality to process events and derive information from the processed events. As discussed above, each event may be raw time-stamped data from a data source. In isolation, the event may only reflect a single action having been performed. However, through data mining and machine learning, the analytics system 902 extracts behavioral information from events, and detects anomalies when behaviors change. By way of some example, the analytics system 902 may be configured to perform security analysis and operations, resource usage analysis and management operations, commerce analysis and management, and other analysis and operations.

By way of a specific example, the analytics system may be configured to analyze events using behavior models. A behavior model defines an expected behavior of the entity being modeled. In the case of network security, the behavior model models the behavior of one or more portions of the network. Behavior models may be trained and, in some implementations, continually updated after their activation, by relevant network actions when the events is received. An example of a relevant network action is an authentication action.

Different types of behavior models may exist. For example, a behavior model may be a security model, such as an anomaly model or a threat model. An anomaly model is used to detect anomalies. When satisfied, the output of an anomaly model is an existence of an anomaly. In this description, an "anomaly" is a detected variation from an expected pattern of behavior on the part of an entity. In security, an anomaly may or may not be indicative of a threat. An anomaly represents an action of possible concern, which may be actionable or warrant further investigation. An anomaly is an observable or detectable fact, or data representing such fact.

A threat model is a behavior model that is used to detect threats. In particular, a threat model may identify one or more anomalies and other data values that are consistent with a threat. Thus, a threat model may not only identify data values or ranges of data values as with anomaly models, but also anomaly types. When triggered and satisfied, the output of the threat model is the existence of a threat.

As an example of scale, the analytics system may be configured to analyze events from hundreds of millions of packets of incoming data from various data sources. The events may yield 100 anomalies, which may be further analyzed to yield 10 threat indicators, which may again be further analyzed to yield one or two threats.

The analytics system 902 may operate in real-time. "Real-time" computing, or "reactive computing", describes computer systems subject to a processing responsiveness restriction (e.g., in a service level objective (SLO) in a service level agreement (SLA)). In real-time processing, conclusions are reached substantially immediately following the receipt of input data such that the conclusions can be used to respond to the observed environment. The analytics system 902 receives new events from the indexer 206 and reacts to each new incoming event by processing the event.

To perform the various analysis, the analytics system 902 is configured to send queries to the data intake and query system 108 and receive matching events from the data intake and query system 108. As shown in the diagram of FIG. 9, the analytics system 902 is communicatively connected to the search head 210. Communicative connection may be via a network (e.g., through one or more network devices) or direct (e.g., through a wired or wireless communication link). The analytics system 902 communicates with the search 210 to send queries and receive a number of events 904. Specifically, the analytics system 902 is configured to send a query to the search head. The query may correspond to the query discussed above with reference to section 2.7. The query is discussed in further detail below in reference to FIG. 11 in accordance with one or more embodiments. The number of events 904 returned by the search head is the aggregated number of events that is aggregated across the indexers. For example, the number of events may be a total number of events. By way of another example, the number of events may be a single number from each indexer that is grouped together in a single message. The search head 210 is configured to distribute the query to the indexers 206.

Specifically, the search head 210 is communicatively connected to each indexer 206 and is configured to send a distributed query 906 to the indexers 208. The distributed query 906 may be the same as the query received by the search head 210. As another example, the distributed query 906 may be the portion of the query referencing events stored in the data store connected to the indexer 208. The distributed query 906 may further specify the destination of matching events (e.g., the analytics system 902). The number of events 906 is the local number of matching events determined by the corresponding indexer 206. In other words, the number of events is a local number of events. Although FIG. 9 shows the search head 210 sending a distributed query to a single indexer 206 and receiving a number of events 906 from the single indexer 206, for any particular query, any number of indexers 206 may receive the distributed query and transmit the number of events 906.

The indexers 206 are configured to send matching events 908 to the analytics system 902. In particular, the indexers 206 are communicatively connected to the analytics system 210 through a communication path that bypasses the search head 210. Because the search head is bypassed, the matching events are not processed, except to be forwarded, until the matching events are received by the analytics system 902. For example, separate communication paths may exist between the indexers 206 and the analytics system 902 to avoid bottleneck. The separate communication paths may be through distinct network devices and/or may include separate bandwidth allocation though the same network device. By being able to transmit the matching events in parallel and allowing for the analytics system 902 to group matching events across indexers 206, one or more embodiments address bandwidth constraints in order to be able to process events in real time.

Figure 10:
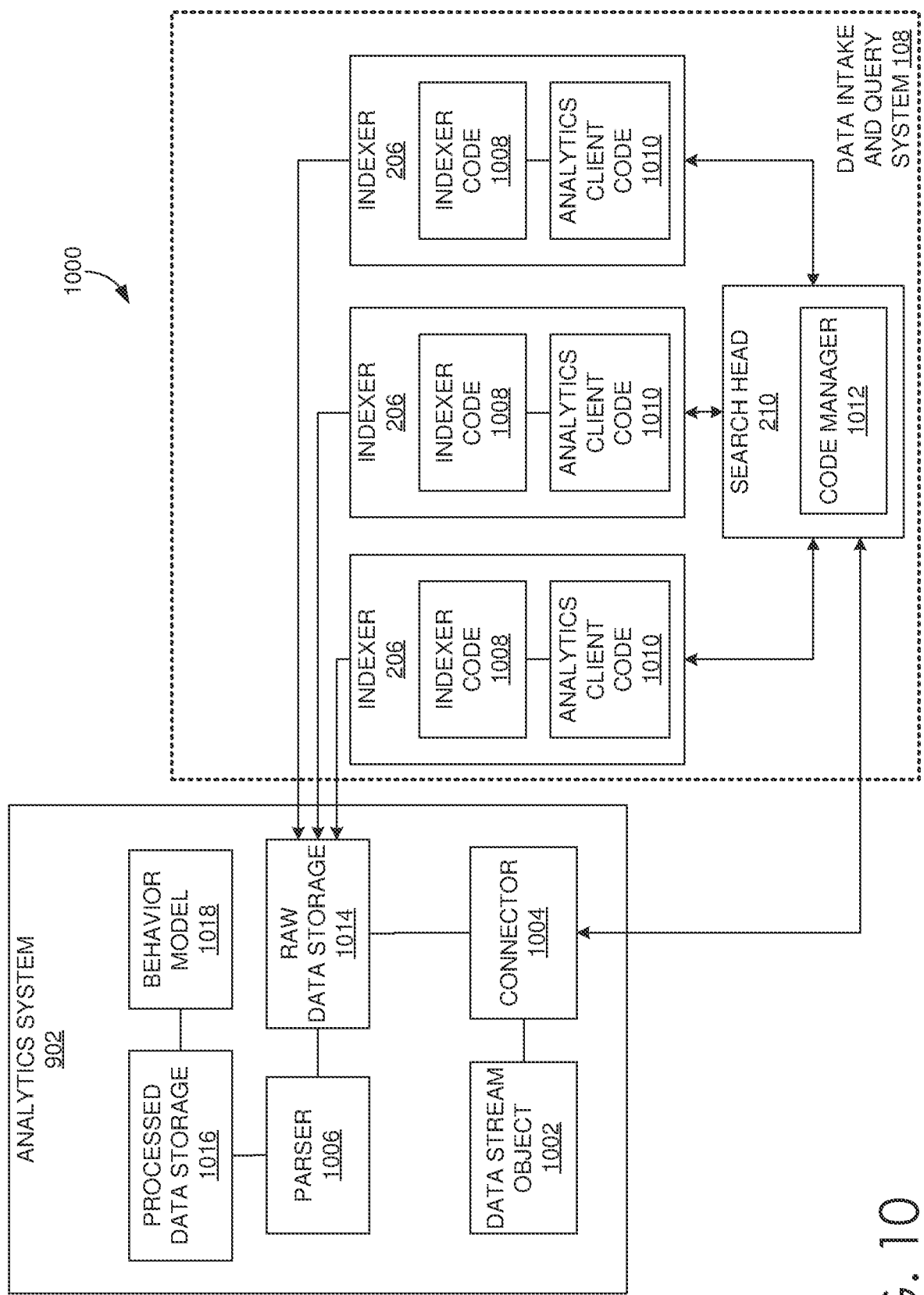
FIG. 10 illustrates a block component diagram of an example data intake and query system connected to an analytics system in accordance with the disclosed embodiments.

FIG. 10 illustrates a block component diagram 1000 of an example data intake and query system connected to an analytics system in accordance with the disclosed embodiments. Specifically, FIG. 10 shows a component diagram of the analytics system 902, search head 210 and indexer 206 shown in FIG. 9. The analytics system 902, search head 210 and indexer 206 shown in FIG. 10 may be the same as the like named components of FIG. 9. For the purposes of simplifying the Figure, the forwarders and the data stores described above are omitted from FIG. 10.

As shown in FIG. 10, the analytics system 902 includes one or more data stream objects 1002, a connector 1004, raw data storage 1014, a parser 1006, preprocessed data storage 1016, and one or more behavior models 1018. In one or more embodiments, the analytics system 902 is configured to perform behavior analysis concurrently. A data stream object 1002 defines a data stream for consumption by the one or more behavior models 1018. For example, the data stream object 1002 may be a single target set of events that are to be monitored and gathered. For example, a data stream object 1002 may correspond to a single request for monitoring by an end user. Each data stream object 1002 may have one or more corresponding behavior models 1018 in the analytics system 902 that is configured to analyze events related to the data stream object 1002. In one or more embodiments, each query from the analytics system 902 corresponds to a data stream object 1002. In one or more embodiments, the query includes identifying information for the corresponding data stream object 1002. Specifically, each data stream has a corresponding data stream identifier. Thus, events that match the query (i.e., are responsive to the query) may also include the data stream identifier. Thus, the data stream object 1002 is the destination for events matching the query. In one or more embodiments, events are communicated using protocol buffers. Although FIG. 10 shows a single data stream object 1002, the analytics system 902 concurrently may have several data stream objects.

A data stream object 1002 includes a connector 1004. The connector 1004 includes functionality to create a query and send the query to the data intake and query system 108 for the data stream object 1002. Specifically, the connector 1004 is configured to create and transmit the query according to the protocols of the data intake and query system 108. The connector 1004 may be configured to communicate with the data intake and query system using the software development kit (SDK) application programming interface (API) of the data intake and query system 108. The connector may be configured to communicate with the data intake and query system 108 using the native protocols of the data intake and query system (e.g., by using the intra-process communication protocols within the data intake and query system).

The raw data storage 1014 is storage for incoming data from the data intake and query system 108. Specifically, the events from the data intake and query system are raw data that is optimized for transmission rather than for consumption by the behavior model. By way of an example, events may be in comma separated value (CSV) format, whereby groups of events share a single header, the single header specifying the field names corresponding to the field values of the events. The raw data storage 1014 is a temporary storage location for storing the incoming events. For example, the raw data storage 1014 may be one or more queues. In some embodiments, the raw data storage 1014 includes the events for multiple data streams intermixed.

The parser 1006 includes functionality to parse events from the raw data storage 1014 to extract values of fields in the events and relate the field values to the corresponding field names The events having field value, field name pairs may be referred to as processed data. The parser 1006 further includes functionality to store the parsed events into preprocessed data storage 1016. The parser 1006 may include functionality to select a preprocessed data storage 1016 to send the event.

Preprocessed data storage 1016 is a storage location for processed data. For example, preprocessed data storage 1016 may be a queue. Multiple preprocessed data storage locations may exist. For example, each preprocessed data storage may be for a single data stream, and each data stream may have a corresponding processed data storage.

Preprocessed data storage may be connected to one or more behavior models 1018. Further, a single behavior model may be connected to multiple preprocessed data storage locations matching each data stream consumed by the behavior model. The behavior model may be the same as discussed above with reference to FIG. 9. A behavior model may be a streaming model or an offline model. A streaming model directly consumes the processed data storage from queues of event. The streaming model may produce real time results. One type of streaming model is a batch aggregate model. The batch aggregate model consumes events from preprocessed data storage and produces an aggregated event from every set of multiple events (e.g., every several thousands of events). The aggregated events are inserted into an offline aggregated data store. One or more offline models may exist that are scheduled once every several hours or days. The offline models read data from the offline aggregated data store and produce anomalies. Although not shown in FIG. 10, the output of a behavior model may be used as input into another behavior model.

Continuing with FIG. 10, the indexers 206 include indexer code 1008 and analytics client code 1010. The indexer code 1008 is the native code of the indexer 206 that includes functionality to receive a distrusted query, search the corresponding data store, perform statistics on the events, and process evaluation commands.

The analytics client code 1010 is connected to the indexer code 1008. The analytics client code 1010 is a custom set of instructions defined specifically for the analytics system 902 that extends the functionality of the indexer 206. The analytics client code 1010 includes instructions for formatting events from the indexer code 1008 and transmitting the events to the analytics system 902. In one or more embodiments, the analytics client code 1010 performs the formatting and transmitting in accordance with parameters in the query from the analytics system 902.

In one or more embodiments, the search head 210 includes a code manager 1012. The code manager 1012 is software that includes functionality to manage the installation and updating of client code on the respective indexers 206. In one or more embodiments, the code manager 1012 is configured to perform on demand installation and updating of the analytics client code 1010 on the respective indexer 206. For example, the code manager may be configured to perform the on demand installation and updating of the analytics client code 1010. In particular, the code manager 1012 may not install the analytics client code 1010 on a particular indexer 206 until a query is received from the analytics server 902 that is to be processed by the particular indexer 206 Similarly, the code manager 1012 may delay transmitting an update of the analytics client code 1010 until after a query is received for the particular indexer. By way of another example, the code manager 1012 may be configured to install and/or update the analytics client code when the analytics client code or an update is available rather than waiting for a query.

Figure 11:
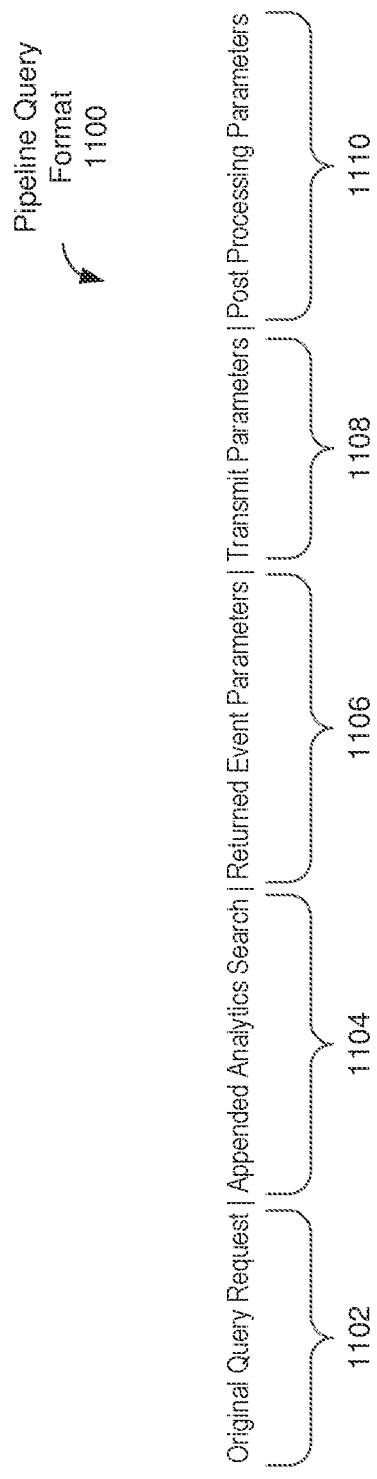
FIG. 11 illustrates a schematic diagram of a query in accordance with the disclosed embodiments.

FIG. 11 illustrates a schematic diagram of a query in accordance with the disclosed embodiments. Specifically, FIG. 11 shows an example format 1100 of the query that includes multiple pipeline commands in accordance with one or more embodiments. The particular ordering of pipeline commands in the query may vary without departing from the scope of the disclosure.

In one or more embodiments, the query includes an original query request 1102, an appended analytics search 1104, returned event parameters 1106, transmit parameters 1108, and post processing parameters 1110. Each of these components is described below.

The original query request 1102 is the request defining the type of events to monitor for the data topic. In one or more embodiments, the original query request is from a requesting system or user to the analytics system. The original query request 1102 may or may not be modified when the query is generated and transmitted.

The appended analytics search 1104 is query information appended by the analytics system. For example, the appended analytics search 1104 may specify the data source type of the data source providing the events, the particular fields of events, and other appended information for processing the search.

The returned event parameters 1106 defines added information to add to events in messages to the analytics system. In other words, the returned event parameters defines additional information that is added to the returned events such that the analytics system can process the events. For example, the returned event parameters 1106 may specify additional fields to add.

In one or more embodiments, the transmit parameters 1108 defines how to transmit the events to the analytics system. For example, the transmit parameters may include transmission protocols, message size, destination addresses (e.g., servers and data topics), compression parameters, and encryption parameters.

The post processing parameters 1110 are parameters for the indexer code to processing events identified in the search. For example, the post processing parameters may include to sum the number of events. The post processing parameters may include other statistical analysis to perform on the event.

Figure 12:
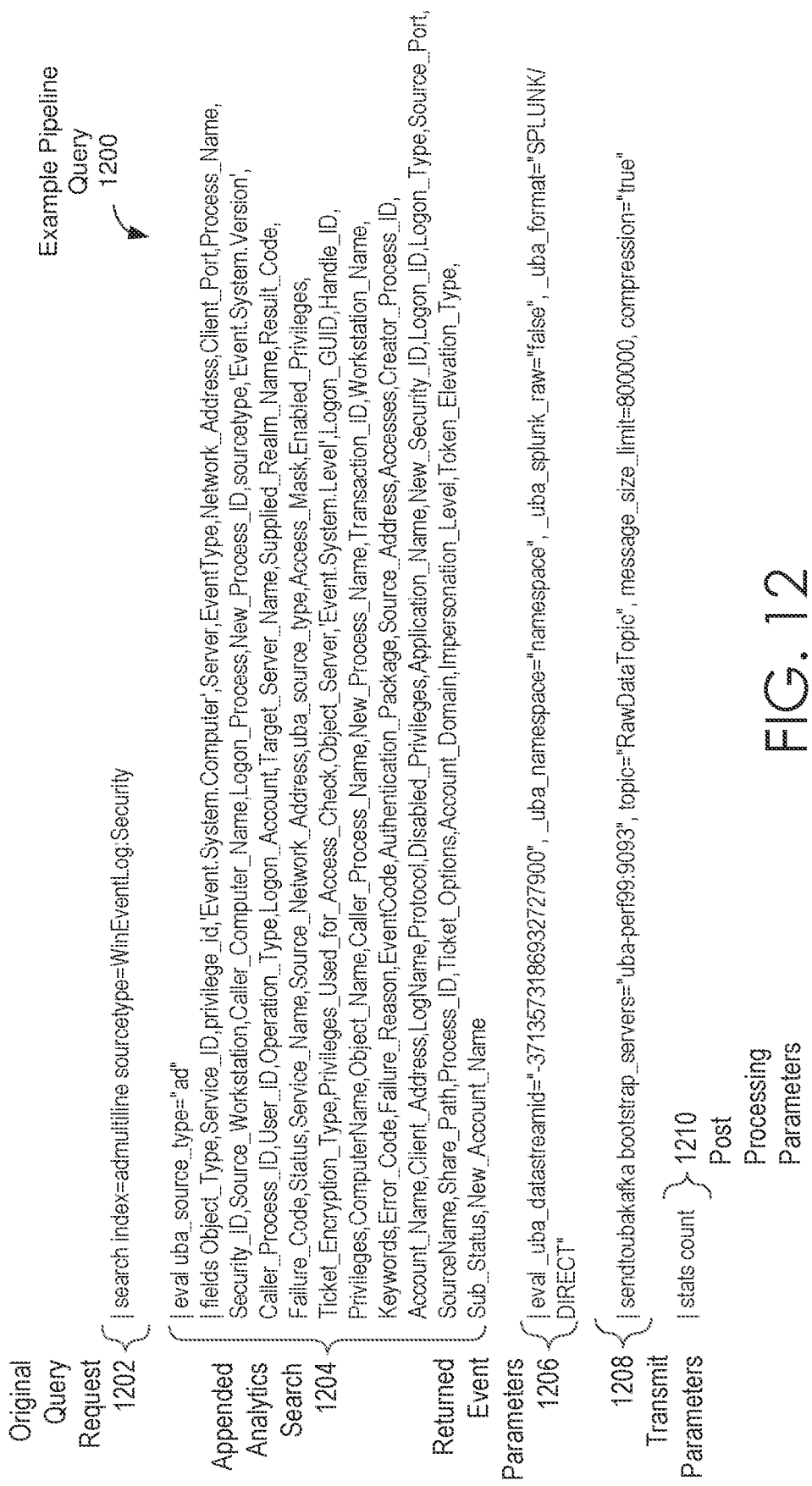
FIG. 12 illustrates an example query in accordance with the disclosed embodiments.

FIG. 12 illustrates an example query 1200 in accordance with the disclosed embodiments. As shown in FIG. 12, the example query 1200 includes an example original query request 1202, an example appended analytics search 1204, example returned event parameters 1206, example transmit parameters 1208, and example post processing parameters 1210. Although each of the components of the query are shown as separate paragraphs, the components may be concatenated together with delimiter characters between components, such as the pipe character shown in FIG. 12.

As shown in FIG. 12, the example original query request 1202 specifies that the search index is named "admultiline" and the data source type is WinEventLog:Security. The data source type specifies the type of data source of matching events. The example appended analytics search 1204 includes an evaluation command and a list of fields. The example appended analytics search 1204 specifies to evaluate according to uba_source_type="ad", and that the fields of the events to include when returning the events are Object_Type, Service_ID, privilege_id, 'Event.System.Computer', . . . , Token_Elevation_Type, etc.

Continuing with the example of FIG. 10, the example returned event parameters 1206 include eval _uba_datasourceid="−3713573186932727900", _uba_namespace= "namespace", _uba_splunk_raw="false", _uba_format= "SPLU NK/DIRECT". The eval command is an instruction to the indexer code to add the append the information in the returned event parameters as additional information for each event. The example returned event parameters specify to append datastreamid="−3713573186932727900", uba_namespace ="namespace", _uba_splunk_raw="false", uba_format="SPLUNK/DIRECT" as the additional information to the returned events that are transmitted to the analytics system. The datastreamid is an identifier of the data stream corresponding to the event as described above with reference to FIG. 10. In the example, the data stream identifier is −3713573186932727900.

The example transmit parameters 1208 includes a client code command, which causes the indexer code to initiate execution of the analytics client code on the indexer. The client code command in the example shown is named "sendtoubakafka," which is a name of the client code in the example. The analytics client code then processes batches of events from the indexer code using the example transmit parameters 1208. The example transmit parameters 1208 specify to send the messages to bootstrap_servers="ubaperf99:9093" with a destination of the message as being data storage="RawDataStorage". The example transmit parameters further specify that the message size limit or the maximum size of a message having events is 800000 bytes. Also, the example transmit parameters specify to perform compression when sending the message having the returned events. The example returned event parameters and the example transmit parameters are used by the analytics client code to format the returned events and send the returned events according to the requirements of the analytics system.

Continuing with FIG. 12, the post processing parameter 1210 is stats count. Stats count specifies to the search head to return a total count of events (i.e., a total summation across indexers). As described above with reference to FIG. 6, the search head transforms stats count to prestats count when distributing the query to the indexers. The prestats count tells the indexers to return a local count of matching events to the search head.

Figure 13:
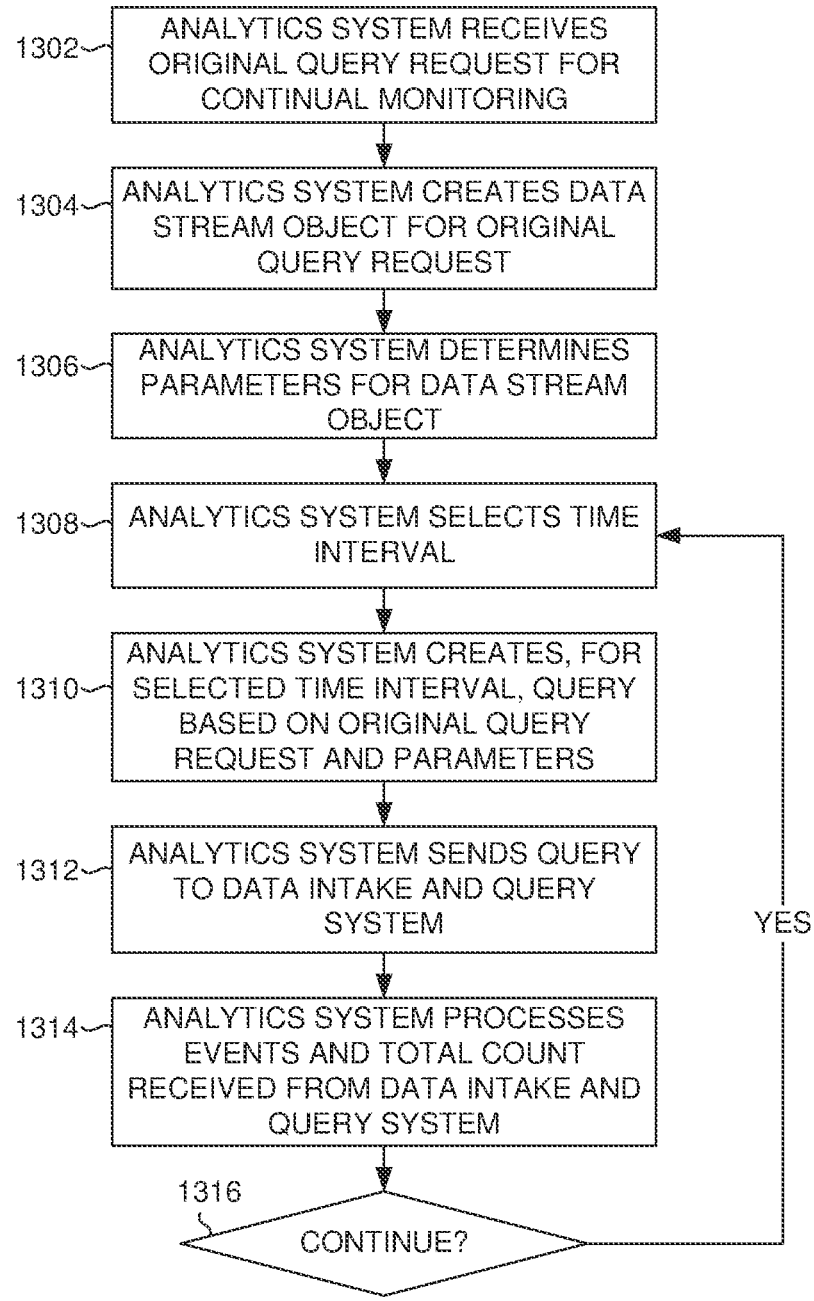
FIG. 13 is a flow diagram that illustrates how an analytics system processes a query in accordance with the disclosed embodiments.
Figure 14:
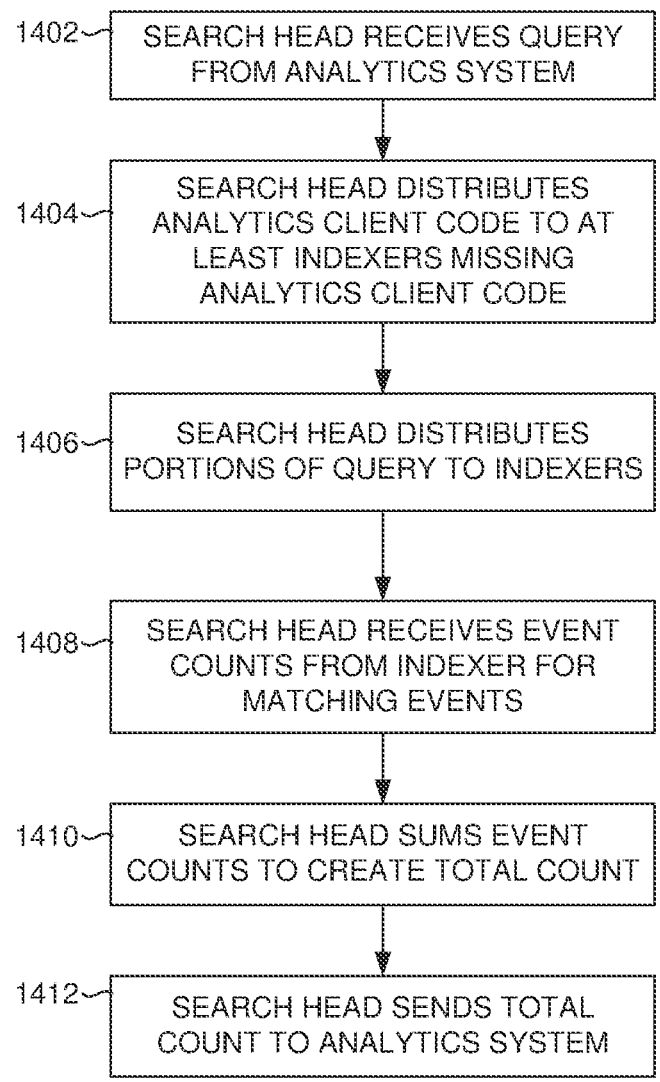
FIG. 14 is a flow diagram that illustrates how a search head processes a query from an analytics system in accordance with the disclosed embodiments.
Figure 15:
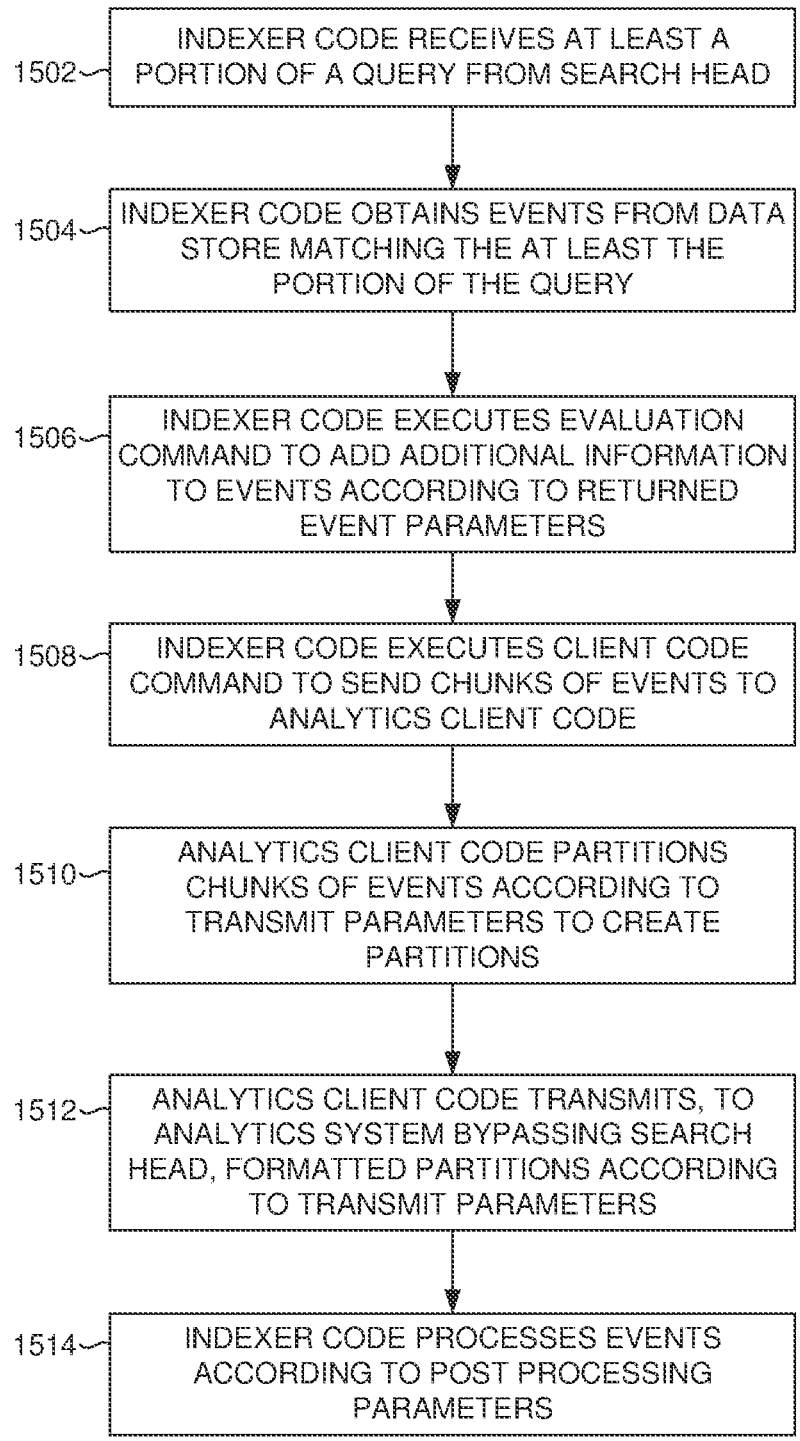
FIG. 15 is a flow diagram that illustrates how indexers process a query in accordance with the disclosed embodiments.

FIGS. 13-15 show flowcharts in accordance with one or more embodiments. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 13 is a flow diagram that illustrates how an analytics system processes a query in accordance with the disclosed embodiments. In one or more embodiments, the analytics system receives requests to perform continual monitoring. For example, the request may be in the form of a creation of a new data stream object.

To perform the continual monitoring, the analytics system may send a query to the data intake and query system that requests matching events as the events are received from the data sources and processed by the indexer. For example, the data intake and query system may be configured to continually send events the analytics system without having multiple queries from the analytics system. While reducing the number of queries reduces the processing of the queries by the search head and the connector, having continual updating may result in data loss. Specifically, if a transmission failure exists between the data intake and query system and the analytics system, the transmission failure may not be detected by the analytics system. As another example, data loss may exist when the analytics system is not able to process events as the events are received. For example, the analytics system may drop the messages having events in the case of buffers overflow.

In one or more embodiments, to address the possibility for data loss, the analytics sends multiple queries for consecutive time intervals to the data intake and query system. In other words, for each of the consecutive time interval, a separate query is transmitted, and resulting events and event counts are received. By sending multiple queries, the analytics system may receive an event count from the search head and use the event count to detect whether data loss occurred.

FIG. 13 is a flow diagram describing how the analytics system may send the multiple queries in accordance with disclosed embodiments. At block 1302, the analytics system receives an original query request for continual monitoring. For example, the analytics system may receive the original query request via the user interface of the analytics system. As another example, the analytics system may receive the original query request through an API of the analytics system from another application.

At block 1304, the analytics system creates a data stream object for the original query request. In other words, the data stream object is created by the analytics system to have a data stream as a destination for events matching the query. The analytics system may also relate the data stream to one or more behavior models to perform behavior analysis on the received events.

At block 1306, the analytics system determines parameters for the data stream object. Specifically, when the data stream object is created, the data stream identifier is assigned to the data stream. Additionally, parameters such as server identifier, and other parameters may be default parameters, obtained from a configuration file, or defined by a user or administrator.

At block 1308, the analytics system selects a time interval. The time interval is the interval of time in which events being timestamp with a time within the time interval are to be return whereas events timestamped with a time outside of the time interval are excluded. Stated another way, the time interval is a constraint on the timestamps of events to be selected as matching events. The length of the time interval is predefined and selected to balance reducing the amount of data loss with reducing the number of queries transmitted. In one or more embodiments, the time intervals are selected in an iterative fashion. In particular, the first time interface selected is the initial time period for monitoring through the predefined length of time. The next time interval selected is the consecutive time interval to the first time interval, and so forth. For example, the first time interval may be the first minute, the second time interval may be the second minute, the third time interval may be the third minute, etc.

At block 1310, the analytics system creates, for the selected time interval, the query based on the original query parameters. Specifically, to the original query request, the analytics system appends the appended analytics search that adds the time interval as an additional constraint on matching events, appends the parameters determined at block 1306, and the post processing parameters.

At block 1312, the analytics system sends the query to the data intake and query system. In one or more embodiments, the query is sent to the search head using the native process communication protocols of the search head. For example, the query may be transmitted to bypass the API processing of the data intake and query system. When the search head receives the query, the search head processes the query as described below and in FIG. 14. The search head sends the query to the indexers that process the query.

At block 1314, the analytics system processes events and a total count from the data intake and query system. Specifically, the connector receives the total count from the search head. The raw data storage receives the events, potentially in parallel, from the multiple indexers and potentially for multiple data streams. The parser may preprocess the events on received events by extracting information from the header, decrypting and decompressing message having events, and transmitting the events to the corresponding preprocessed data storage. The parser parses the events to distinguish between events and to transform the events to having field name, field value pairs. As another example, the parser may be configured to store the events in a structured database, where the structured database is a preprocessed data storage. In one or more embodiments, when parsing the received events, the parser calculates a total count of events received from the indexers. The parser compares the total count to the total count received by the connector from the search head. If the total counts matches, then data loss is deemed not to have occurred. If the total count does not match, then data loss may be deemed to have occurred, and the query may be resubmitted.

As part of processing the events, the behavior models may obtain the data from one or more preprocessed data storage locations and perform behavior analytics on the events. The behavior model may further use output from other behavior models as input. The result of the behavior model may be an alert, a notification, a state identifier, or other output.

At block 1316, a determination is made whether to continue. For example, the analytics system may continue to create and send queries for consecutive time periods until a stop command is received or until a predefined time period has elapsed. In some embodiments, the analytics system may lag behind and not be able to keep up with the current time period. For example, events matching queries from the analytics system may be received by the data intake and query system from data sources faster than the analytics system can request and process the events. However, because analytics system sends queries for specific time periods, the analytics system can control the speed at which events are received at the analytics system and processed. By reducing the length of the time interval and slowing down the speed at which the analytics system sends queries to the data intake and query system, the analytics system may reduce data loss.

FIG. 14 is a flow diagram that illustrates how a search head processes a query from an analytics system in accordance with the disclosed embodiments. At block 1402, a search head receives a search query from the analytics system.

At block 1404, the search head distributes the analytics client code to at least the indexers that are missing the analytics client code. As described above, the installation and updating of the analytics client code on the indexers may be performed on demand. The search head may identify the indexers missing the current version of the analytics client code from a local data store or by querying the indexers. The search head installs or updates the identified indexers missing the analytics client code.

At block 1406, the search head distributes the portions of the query to the indexers. Specifically, the search head forwards the query the indexers. Modifications on the query may be performed, such as transforming the post processing parameter to a local request as described above with reference to FIG. 5.

At block 1408, the search head receives event counts from the indexers for matching events. Each indexer sends a local count of the number of matching events identified by the indexer. In order to monitor for data loss, the local count from the indexer may be zero. Thus, the search head receives a local count from each identified indexer. Because the event count is a single number, only a small amount of data is sent to the search head.

At block 1410, the search head sums the event counts to create a total count. Because the summation is a simple calculation, the search head is not a bottleneck by aggregating the local event counts. Further, by having different communication paths for the event counts as for matching events, one or more embodiments mitigate for the effects of data loss.

At block 1412, the search head sends the total count to the analytics system. In particular, the search head responds to the connector on the analytics system with the event count. As the event count is a number, the amount of data transmitted from the search head to the analytics system is small as compared to the matching events. Thus, the link between the search head and the analytics system is not bottlenecked by sending the event count.

FIG. 15 is a flow diagram that illustrates how indexers process a query in accordance with the disclosed embodiments. For the purposes of simplifying the description, FIG. 15 is from the perspective of a single indexer. FIG. 15 may be performed by each indexer that receives the query in one or more embodiments.

At block 1502, the indexer code receives at least a portion of the query from the search head. When an indexer receives a distributed query, which is the at least the portion of the query, the indexer code on the indexer starts processing the query.

At block 1504, the indexer code obtains events from the data store matching the at least the portion of the query. To determine which events are responsive to the query, the indexer searches for events that match the criteria specified in the query. These criteria can include matching keywords or specific values for certain fields. The searching operations may use the late-binding schema to extract values for specified fields from events at the time the query is processed. In an embodiment, one or more rules for extracting field values may be specified as part of a source type definition.

At block 1506, the indexer code executes the evaluation commend to add additional information to the matching events according to the returned event parameters. The matching events with additional information may be referred to as modified events. For example, indexer code may add additional fields specified in the returned event parameters. The additional fields are used by the parser to parse the events and determine the data stream matching the events in one or more embodiments. The indexer code creates chunks of the modified events whereby each chunk has events matching the query that are modified to add the additional information.

At block 1508, the indexer code executes the client code command to send the chunks of events to the analytics client code. Specifically, the client code command is a command that initiates execution of the analytics client code. When the analytics client code is initiated, the chunks of events from the indexer code are referenced and the reference passed to the analytics client code. Because the analytics client code is defined for the analytics system, the analytics client code is configured to process events for consumption by the analytics system.

At block 1510, the analytics client code partitions the chunks of events according to the transmit parameters to create partitions. The transmit parameters specify the maximum message size. In one or more embodiments, the partitioning is performed to change the size of the chunks to match the maximum message size.

At block 1512, the analytics client code transmits, to the analytics system bypassing the search head, formatted partitions according to the transmit parameters. The transmit parameters specify the protocols for sending messages and the destination of the messages. Thus, the analytics client code transmits the messages from the indexer to the analytics system. In one or more embodiments, the transmission is direct, e.g., through a network path and one or more network devices, without further processing of individual events in the messages. The messages are directed to the raw data storage on the analytics system.

At block 1514, the indexer code before, concurrently, or after processing by the analytics client code, may process the events according to post processing parameters. Processing the events may be to determine a local count of the number of matching events and return the local count to the search head. The local count is transmitted by the indexer to the search head in response to the query from the search head.

Throughout the above description, matching events are described as being returned from the indexer to the analytics system. The events that are returned may be all or only a part of each event returned without departing from the scope of the claims. Specifically, an event is deemed transmitted when at least one portion of the event is transmitted. For example, only a selected set of fields of each matching event may be transmitted from the indexer to the analytics system. The selected set of fields may be defined in the search criteria FIG. 16 is an example of a returned event message 1600 in accordance with disclosed embodiments. The returned event message 1600 may include a header 1602 and matching events 1604, 1606, 1608, 1610. For the purposes of simplifying the description, only a portion of only four matching events are shown as being in a message. The message may have many more matching events where each event has more than the number of fields shown. The header 1602 in the example includes the destination topic and a list of fields identifiers of fields returned for each event. The header information may include additional information not shown. The events are returned as comma separated values. When a field does not exist for the event, commas are still used as a placeholder for the missing field so that the parser is able to parse the event. Thus, when the analyzer system receives the message from the indexer, the analyzer system is able to parse the events and perform the analytics on the events.

4.0 HARDWARE

The various components of the figures may be a computing system or implemented on a computing system. For example, the operations of the data stores, indexers, search heads, host device(s), client devices, data intake and query systems, data sources, external resources, and/or any other component shown and/or described above may be performed by a computing system. A computing system may include any combination of mobile, desktop, server, router, switch, embedded device, or other types of hardware. For example, the computing system may include one or more computer processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, infrared interface, network interface, optical interface, etc.), and numerous other elements and functionalities. The computer processor(s) may be an integrated circuit for processing instructions. For example, the computer processor(s) may be one or more cores or micro-cores of a processor. The computing system may also include one or more input devices, such as a touchscreen, keyboard, mouse, microphone, touchpad, electronic pen, or any other type of input device.

The computing system may be connected to or be a part of a network. For example, the network may include multiple nodes. Each node may correspond to a computing system, such as the computing system, or a group of nodes combined may correspond to the computing system. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system may be located at a remote location and connected to the other elements over a network.

The node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes in the network may be configured to provide services for a client device. For example, the nodes may be part of a cloud computing system. The nodes may include functionality to receive requests from the client device and transmit responses to the client device. The client device may be a computing system. Further, the client device may include and/or perform all or a portion of one or more embodiments of the disclosure.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

While the above figures show various configurations of components, other configurations may be used without departing from the scope of the disclosure. For example, various components may be combined to create a single component. As another example, the functionality performed by a single component may be performed by two or more components.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   receiving, by an analytics system, an original query request for continual monitoring;
   generating, by the analytics system, a data stream object for the original query request;
   determining, by the analytics system, a plurality of parameters for the data stream object;
   generating, by the analytics system, a query using the original query request and the plurality of parameters;
   transmitting, by the analytics system, the query to a search head;
   receiving, by the search head in a data intake and query system, the query from the analytics system;
   distributing, by the search head, a portion of the query to an indexer for processing the query;
   transmitting, by the indexer, bypassing the search head, and to the analytics system, a plurality of events matching the query;
   receiving, by the search head, from the indexer, data regarding the plurality of events;
   sending, by the search head, the data regarding the plurality of events to the analytics system;
   processing, by the analytics system, the plurality of events, wherein processing the plurality of events comprising obtaining an analytics system event count;
   comparing the analytics system event count with an event count received from the search head to obtain a comparison result, the event count received from the search head being in the data regarding the plurality of events; and
   determining whether data loss exists based on the comparison result.

2. The method of claim 1, wherein the data regarding the plurality of events is the event count.

3. The method of claim 1, further comprising:
   distributing, by the search head, analytics client code to the indexer when the indexer is determined to be missing the analytics client code, wherein the analytics client code is configured to process the portion of the query.

4. The method of claim 1, further comprising:
   summing an event count across each of the indexer to obtain a total count, wherein sending the data regarding the plurality of events comprises sending the total count to the analytics system.

5. The method of claim 1, further comprising:
   receiving, by the indexer, the portion of the query from the search head;
   obtaining, by the indexer, the plurality of events from a data store matching the portion of the query;
   adding, by the indexer, additional information to the plurality of events according to a returned event parameter to create a plurality of modified events;
   partitioning, by the indexer, a plurality of chunks of the plurality of modified events according to a transmit parameter in the portion of the query to create a plurality of partitions; and
   transmitting, by the indexer and to the analytics system, the plurality of partitions.

6. The method of claim 1, wherein the query comprises: the original query request, an appended analytics search, a returned event parameter, a transmit parameter, and a post processing parameter.

7. The method of claim 1, further comprising:
   executing, by indexer code executing on the indexer, a client code command to transmit the plurality of events to an analytics client code executing on the indexer, wherein the analytics client code transmits the plurality of events matching the query.

8. The method of claim 1, wherein the generating of the query is performed for each of a plurality of time intervals.

9. The method of claim 1,
   wherein the generating of the query is performed for each of a plurality of time intervals, and
   wherein the plurality of time intervals is continuous.

10. The method of claim 1, further comprising:
    transforming, by the search head, a post processing parameter for a total count in the query to request a local count and create an updated query,
    wherein distributing the portion of the query comprises sending the updated query.

11. The method of claim 1, further comprising:
    generating, by the indexer, a plurality of messages comprising the plurality of events, each of the plurality of messages comprising a subset of the plurality of events with additional information, wherein the additional information is defined according to a returned event parameter in the query.

12. The method of claim 1, wherein the query comprises a plurality of returned event parameters, wherein the plurality of returned event parameters comprises a data stream identifier, an analytics system identifier, and a formatting type, and wherein the plurality of returned event parameters is appended as additional information to the plurality of events.

13. The method of claim 1, wherein the query comprises a plurality of transmit parameters, wherein the plurality of transmit parameters comprises a server identifier, a topic identifier, and a message size limit.

14. The method of claim 1, wherein the plurality of events comprises raw machine data comprising a plurality of timestamp entries.

15. A system comprising:
    an analytics server comprising an analytics system, the analytics system configured to:
       receive an original query request for continual monitoring, generate a data stream object for the original query request,
determine a plurality of parameters for the data stream object,
generate a query using the original query request and the plurality of parameters, and
transmit the query to a search head;
the search head, located in a data intake and query system, the search head configured to:
receive the query from the analytics system,
distribute a portion of the query to an indexer server for processing the query,
receive, from the indexer server, data regarding a plurality of events, and
send the data regarding the plurality of events to the analytics system; and
the indexer server, located in the data intake and query system and communicatively connected to the search head, the indexer server configured to transmit, bypassing the search head, and to the analytics system, the plurality of events matching the query,
wherein the analytics server is further configured to:
process the plurality of events, wherein processing the plurality of events comprising obtaining an analytics system event count;
compare the analytics system event count with an event count received from the search head to obtain a comparison result, the event count received from the search head being in the data regarding the plurality of events; and
determine whether data loss exists based on the comparison result.

16. The system of claim 15, wherein the search head comprises analytics client code and a code manager stored in memory, and wherein the code manager is further configured to:
distribute, the analytics client code to the indexer server when the indexer server is determined to be missing the analytics client code, wherein the analytics client code is configured to process the query.

17. The system of claim 15, wherein the search head is further configured to:
sum an event count across each of the indexer server to obtain a total count, wherein sending the data regarding the plurality of events comprises sending the total count to the analytics system.

18. The system of claim 17,
wherein the analytics system is further configured to:
receive the plurality of events from the indexer server,
preprocess, to create preprocessed data, the plurality of events according to additional information added to the plurality of events by the indexer server, the additional information specified in the query, and
store the preprocessed data.

19. A system comprising
a memory;
a computer processor;
analytics system code stored in the memory, that when executed by the computer processor causes the computer processor to:
receive an original query request for continual monitoring;
generate a data stream object for the original query request;
determine a plurality of parameters for the data stream object;
generate a query using the original query request and the plurality of parameters; and
transmit the query to a search head;
indexer code stored in the memory, that when executed by the computer processor causes the computer processor to:
receive a portion of the query from the search head,
obtain a plurality of events from a data store matching the portion of the query,
execute a client code command to transmit the plurality of events to an analytics client code, and
transmit data regarding the plurality of events to the search head; and
the analytics client code stored in the memory, that when executed by the computer processor causes the computer processor to:
partition a plurality of chunks of events according to a transmit parameter in the portion of the query to create a plurality of partitions, and
transmit, to the analytics system code originating the query and bypassing the search head, the plurality of partitions,
wherein the analytics system code further causes the computer processor to:
process, the plurality of events, wherein processing the plurality of events comprising obtaining an analytics system event count;
compare the analytics system event count with an event count received from the search head to obtain a comparison result, the event count received from the search head being in the data regarding the plurality of events; and
determine whether data loss exists based on the comparison result.

* * * * *